US006974305B2

(12) United States Patent
Garrett, III

(10) Patent No.: US 6,974,305 B2
(45) Date of Patent: Dec. 13, 2005

(54) ROTO-DYNAMIC FLUIDIC SYSTEMS

(76) Inventor: Norman H. Garrett, III, 460 Windship Pl., Atlanta, GA (US) 30327

( * ) Notice: Subject to any disclaimer, the term of this patent is extended or adjusted under 35 U.S.C. 154(b) by 72 days.

(21) Appl. No.: 10/672,509

(22) Filed: Sep. 26, 2003

(65) Prior Publication Data

US 2004/0062647 A1  Apr. 1, 2004

Related U.S. Application Data

(60) Provisional application No. 60/414,238, filed on Sep. 26, 2002, provisional application No. 60/419,751, filed on Oct. 18, 2002, provisional application No. 60/428,073, filed on Nov. 21, 2002, provisional application No. 60/441,623, filed on Jan. 21, 2003, provisional application No. 60/463,689, filed on Apr. 16, 2003, provisional application No. 60/448,017, filed on Feb. 18, 2003, provisional application No. 60/453,139, filed on Mar. 10, 2003, provisional application No. 60/478,881, filed on Jun. 16, 2003, provisional application No. 60/482,707, filed on Jun. 26, 2003.

(51) Int. Cl.$^7$ .............................................. F03B 11/06
(52) U.S. Cl. .................. 415/230; 415/206; 416/186 R; 416/223 B
(58) Field of Search ................................ 415/206, 230, 415/194; 416/186 R, 223 B

(56) References Cited

U.S. PATENT DOCUMENTS

| | | | | |
|---|---|---|---|---|
| 885,108 A | * | 4/1908 | Trent | 415/204 |
| 1,758,207 A | | 5/1930 | Walker | |
| 1,883,868 A | | 10/1932 | Beckeman | |
| 2,276,404 A | | 3/1942 | Lundquist | 230/134 |
| 2,316,522 A | | 4/1943 | Loeffler | 122/11 |
| 2,991,764 A | | 7/1961 | French | 122/26 |
| 3,063,673 A | | 11/1962 | Johnson | 253/55 |
| 3,242,908 A | | 3/1966 | Kopczynski | 122/11 |
| 3,508,402 A | | 4/1970 | Gray | 60/108 |
| 3,647,314 A | | 3/1972 | Laessig | 415/206 |
| 3,690,302 A | | 9/1972 | Rennolds | 122/11 |
| 3,720,372 A | | 3/1973 | Jacobs | 237/12.3 |
| 3,791,349 A | | 2/1974 | Schaefer | 122/11 |
| 3,933,007 A | | 1/1976 | Eskeli | 62/401 |
| 3,937,034 A | | 2/1976 | Eskeli | 62/401 |
| 4,003,672 A | | 1/1977 | Gamell | 415/71 |
| 4,277,020 A | | 7/1981 | Grenier | 237/1 |
| 4,294,549 A | * | 10/1981 | Thompson et al. | 366/170.3 |
| 4,381,762 A | | 5/1983 | Ernst | 126/247 |
| 4,424,797 A | | 1/1984 | Perkins | 126/247 |
| 4,480,592 A | | 11/1984 | Gökcen | 122/26 |
| 4,483,277 A | | 11/1984 | Perkins | 122/26 |
| 4,501,231 A | | 2/1985 | Perkins | 122/26 |
| 4,651,681 A | | 3/1987 | Perkins | 122/26 |
| 4,664,068 A | | 5/1987 | Kretchmar et al. | 122/26 |
| 4,779,575 A | | 10/1988 | Perkins | 122/26 |
| 4,781,151 A | | 11/1988 | Wolpert, Jr. et al. | 122/26 |
| 4,786,230 A | * | 11/1988 | Thut | 415/200 |
| 4,798,176 A | | 1/1989 | Perkins | 122/26 |

(Continued)

*Primary Examiner*—Edward K. Look
*Assistant Examiner*—Igor Kershteyn
(74) *Attorney, Agent, or Firm*—Thomas, Kayden, Horstemeyer & Risley LLP

(57) ABSTRACT

An apparatus and method for generating cavitation in fluids is disclosed. The apparatus includes a housing for receiving a rotor, which is driven by a motive force. Multiple embodiments of the rotors are disclosed including, but not limited to, centrally feed, centrally drained, face feed, and face drained rotors. In one preferred embodiment, cavitation is enhanced by inducing tensile stress in the fluid by subjecting the fluid centrifugal force or centripital force depending upon the flow of the fluid.

11 Claims, 14 Drawing Sheets

U.S. PATENT DOCUMENTS

| | | | |
|---|---|---|---|
| 5,188,090 A | 2/1993 | Griggs | 126/247 |
| 5,261,783 A | 11/1993 | Noyes | 415/71 |
| 5,341,768 A * | 8/1994 | Pope | 122/26 |
| 5,385,298 A | 1/1995 | Griggs | 237/1 |
| 5,599,164 A * | 2/1997 | Murray | 415/144 |
| 5,810,052 A | 9/1998 | Kozyuk | 138/37 |
| 5,914,027 A | 6/1999 | Ellingsen | 208/126 |
| 5,957,122 A * | 9/1999 | Griggs | 126/247 |
| 5,975,843 A * | 11/1999 | Ebihara | 415/119 |
| 2002/0077373 A1 | 6/2002 | Hudson et al. | 516/98 |

* cited by examiner

ROTO-DYNAMIC FLUIDIC SYSTEMS

CROSS-REFERENCE TO RELATED APPLICATIONS

The present application claims the benefit of the following U.S. Provisional Patent Applications: Ser. No. 60/414,238, filed Sep. 26, 2002; Ser. No. 60/419,751, filed Oct. 18, 2002; Ser. No. 60/428,073, filed Nov. 21, 2002; Ser. No. 60/441,623, filed Jan. 21, 2003; Ser. No. 60/463,689, filed Apr. 16, 2003; Ser. No. 60/448,017, filed Feb. 18, 2003; Ser. No. 60/453,139, filed Mar. 10, 2003; Ser. No. 60/478,881, filed Jun. 16, 2003; and Ser. No. 60/482,707, filed Jun. 26, 2003, all of which are hereby incorporated by reference.

BACKGROUND OF THE INVENTION

Hydrodynamic cavitation is a physical phenomenon that involves the formation and collapse of cavities within a liquid. The cavities (bubbles) are often filled with a vapor-gas mixture and are typically created by reducing a fluid's local pressure. The vapor bubbles, once formed, cannot hold their shape, being formed by fluid walls, and their rapid collapse creates mixing, emulsification, dispersion, and kinetic effects which may be useful. Since the fluid is typically near its particular phase transformation at the inception of cavitation, the process can be used for particle dispersion, atomization, and emulsion formation. Sufficient agitation can be imparted such that full vaporization can be accomplished, if so desired. In addition, the cavitation of certain substances create desired chemical reactions. For example, the cavitation of water produces OH radicals and peroxides which serve to attack any biological contaminants within the water, providing a level of disinfection of the water through the occurrence of cavitation.

The mechanism of the bubble collapse, as described in the field, is that a "finger" of fluid is pulled through the surface of the bubble, which has lower pressure than the surrounding fluid, from a single point (or a small local region) of the bubble's surface. This finger forms a micro-jet of fluid, which strikes the opposing surface of the bubble with great force and speed (measured as being supersonic). This collision creates forces that can be disruptive to the chemical structure of the fluid. Sonochemistry involves the studying of such forces to facilitate various chemical reactions and efforts, including atomization.

Traditionally, hydrodynamic cavitation is created by pumping a fluid through a venturi of some sort. The restrictive portion of the venturi creates the necessary local velocity increase and corresponding pressure drop, which precipitates cavitation. A venturi may be formed by a fixed diameter throat that is smaller in diameter than an upstream inlet, smoothly transitioned from the inlet and onward to the outlet, or it may be formed by a simple restriction placed inside a fluid flow field which has a similar effect of raising the fluid's velocity and thus lowering its pressure. This occurs in accordance with Bernoulli's principle which states that for steady flow of an incompressible fluid the pressure will decrease if the velocity increases, and visa versa. In the case of a venturi, the restriction causes an increase in the fluid's local velocity and thus lowers its pressure. This can be accomplished through the use of a simple restrictive element as well, although flow losses will be greater. Conventional venturi systems are held fixed and a fluid is passed through them.

The pressure reduction created by venturis (or restrictive elements in passages) has been utilized to create cavitation in fluids by reducing a fluid's local pressure to a level below its vaporization pressure, causing vapor bubbles to form in the fluid. These bubbles collapse, in the case of a venturi, once the pressure of the fluid recovers downstream of the venturi throat, the higher relative fluid pressure causing the vapor bubble to implode upon itself with great force.

It is also observed in experiments that do no involve centrifugal or centripetal forces such as experiments involving stretching a fluid using a piston and cylinder or by cooling a fluid in a fixed volume that vapor bubbles may be created within a fluid through the application of tensile stresses to the fluid. Due to the weak molecular bonds existing within a fluid, once the tensile strength of the fluid is exceeded, the fluid "fractures" and forms a vapor bubble. If the tensile stress within the fluid is removed in a sufficiently rapid fashion, the bubble will collapse, completing the cavitation cycle.

SUMMARY OF THE INVENTION

Embodiments, among others, of the present invention provide an apparatus and method for facilitating cavitation in a fluid.

Briefly described, in architecture, one embodiment of the apparatus, among others, can be implemented as follows. The apparatus includes a housing that has a generally hollow interior for receiving a rotor. A rotor having an exterior surface is disposed in the housing, and the rotor defines a first opening disposed on the exterior surface and a second opening with a fluid passage extending therebetween. The fluid passage facilitates cavitation in a fluid.

In another embodiment, an apparatus includes a rotor having a front face, an opposed rear face, and an exterior surface extending therebetween. The exterior surface of the rotor defines an plurality of irregularly spaced cavities disposed thereon.

Embodiment of the present invention can also be viewed as providing methods for inducing cavitation. In this regard, one embodiment of such a method, among others, can be broadly summarized by the following steps: providing a fluid; and inducing tensile stress in the fluid for facilitating controlled cavitation through rotation.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

DETAILED DESCRIPTION OF PREFERRED EMBODIMENTS

Figure 1A:
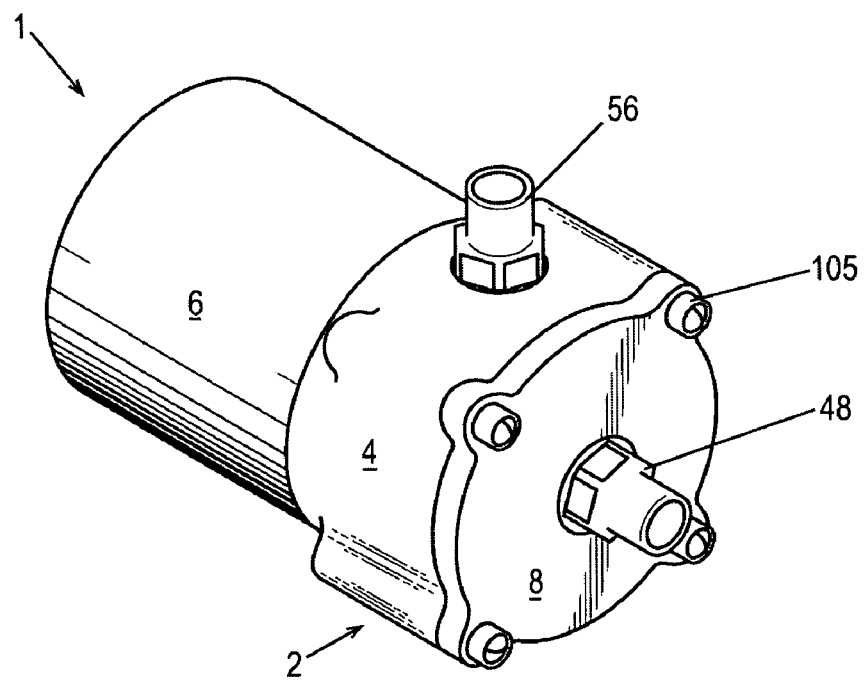
FIG. 1A is an isometric view of a roto-dynamic fluidic system.
Figure 1B:
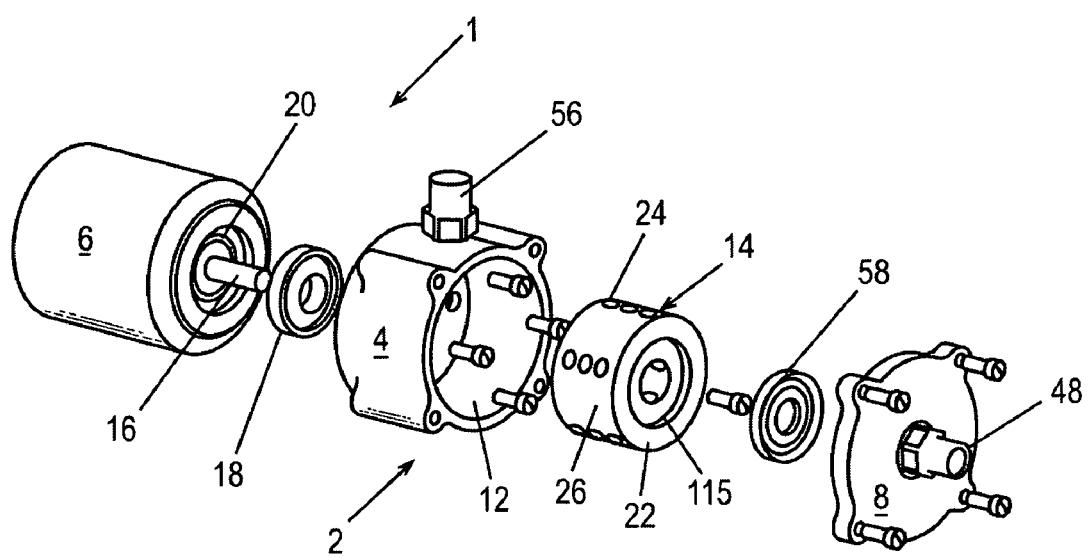
FIG. 1B is an exploded view of a roto-dynamic fluidic system.

Many aspects of the preferred embodiments, among others, of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views. Except for some embodiments in which like numbers denote elements having at least one structural or functional similarity.

For the purposes of this disclosure the following definitions are provided:

Vaporization: the formation of vapor bubbles within a fluid at a temperature lower in value than its normal boiling point for a given pressure.

Cavitation: the formation and subsequent collapse of vapor bubbles within a fluid at a temperature that is below its normal boiling point for a given pressure.

Centrifugal force: the component of apparent force on a element in curvilinear motion, as observed in the non-inertial reference frame of the element, that is directed away from the axis of rotation in a direct radial vector.

Centripetal force: the component of force acting on a body in curvilinear motion that is directed toward the center of the axis of rotation as viewed from an inertial reference frame.

Inertia: the tendency of an element in motion to remain in motion, or for an element at rest to remain at rest, or for an element traveling in one direction to remain traveling along that vector or direction.

Sonochemistry: the use of the high levels of acoustic energy created within a cavitation bubble collapse event to affect chemical reactions, and applies to cavitation caused by any process, be it ultrasonic excitation of a fluid, or the hydrodynamic manipulation of a fluid to induce cavitation in same, or any other means of creating cavitation within fluids.

Figure 2A:
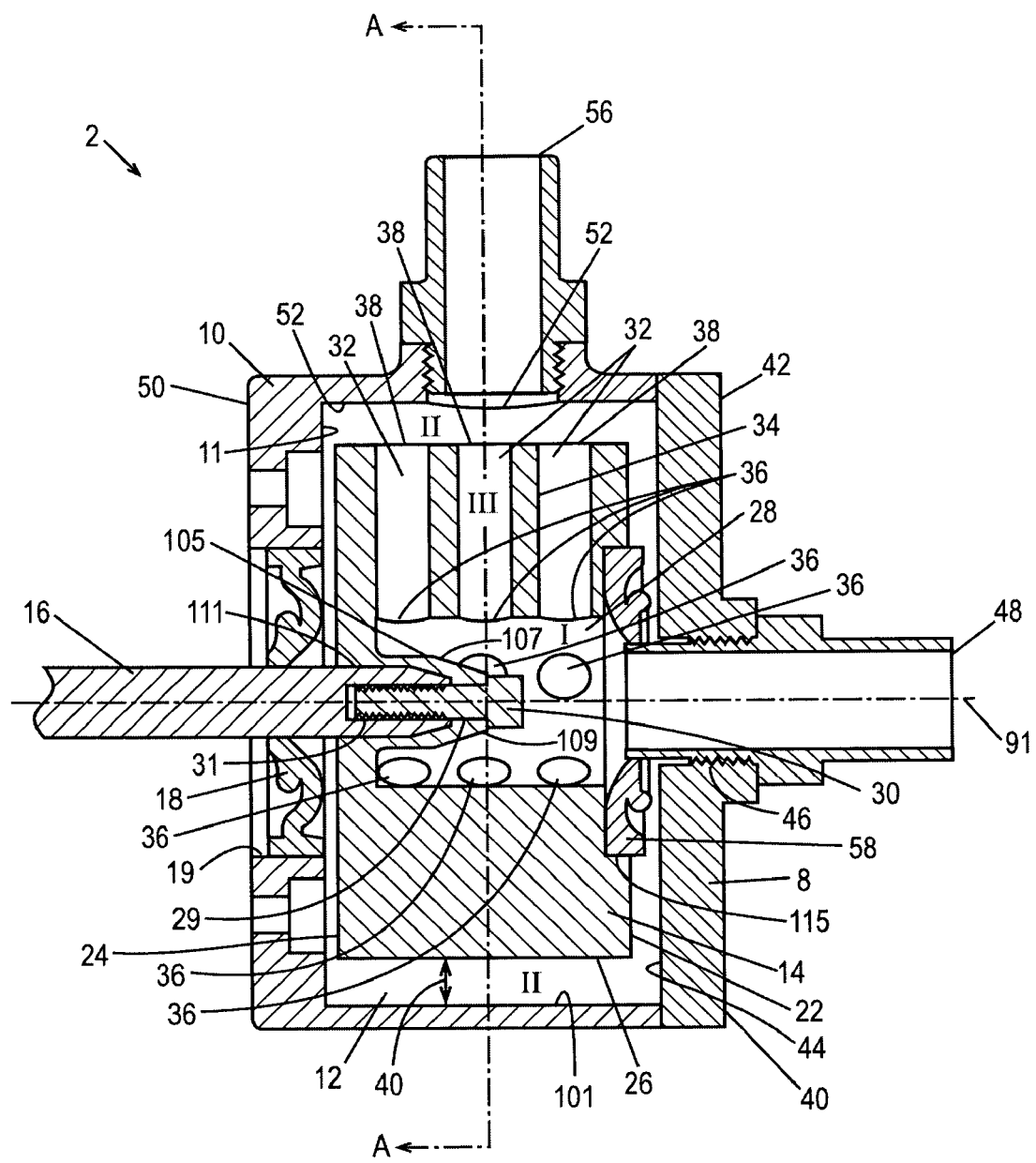
FIG. 2A is an cross sectional view of a roto-dynamic fluidic device.
Figure 2B:
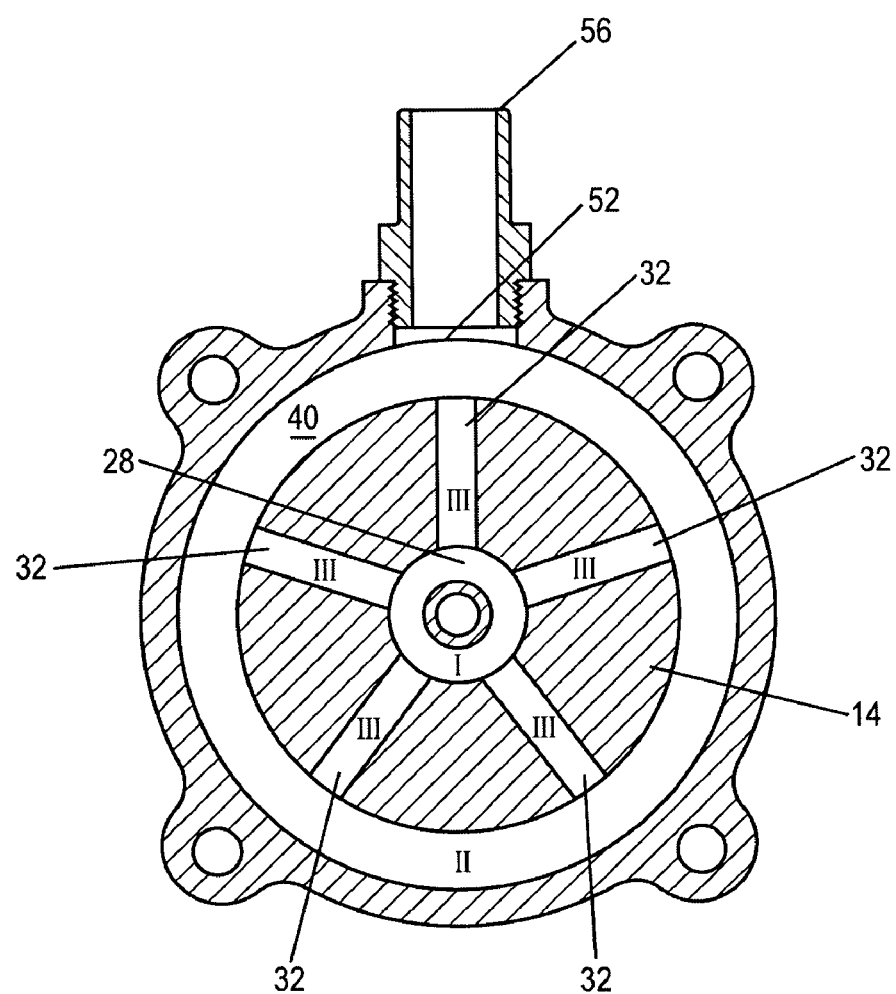
FIG. 2B is an cross sectional view of a roto-dynamic fluidic device.

Refer now in more detail to the drawings, in which like numerals indicate corresponding parts throughout the several views. Referring to FIGS. 1A and 1B and FIGS. 2A and 2B, a roto-dynamic system 1 includes a roto-dynamic fluidic device 2 and motor 6. In FIG. 1A the roto-dynamic system 1 is shown in perspective view, and in FIG. 1B the roto-dynamic fluidic device 2 is shown in exploded from the motor 6. In FIG. 2A the roto-dynamic fluidic device 2 is shown and a portion of a shaft 16 in longitudinal cross section, and in FIG. 2B the roto-dynamic fluidic device is shown in cross section as viewed from line A—A of FIG. 2A. The roto-dynamic fluidic device 2 includes a housing 2, and the housing 2 is coupled to the motor 6 via bolts. The housing 4 includes a front plate 8, which is bolted onto a base portion 10. The base portion 10 defines a cavity 12, which is generally cylindrical. Disposed within the cavity 12 is a rotor 14, which is held by the shaft 16. The solid line 91 passing through the roto-dynamic fluidic device 2 denotes the center of rotation of the rotor 14.

The shaft 16 is longitudinally rotatable and driven by the motive source 6. A sealing element 18 abuts the shaft 16 and prevents fluid from escaping rearward from the cavity 12. Preferably, the sealing element includes a rubber ring member 113 held in place by tension from a ring member 115 of metal nature. Of course, other embodiments include other types of seals as would be understood by those skilled in the art. A support bearing 20 supports the shaft 16.

The rotor 14 is approximately cylindrical in shape having a front face 22 and a rear face 24 and a longitudinal exterior 26 extending therebetween. A center void 28 extends from the front 22 of the rotor rearward. The region between the center void 28 and the rear face 24 is a boss 105, and the boss 105 defines an opening 29 that extends between the center void 28 and the rear face 24. Typically, a threaded bolt 30 extends from the center void 28 rearward through the opening 29 to the shaft 16. The shaft 16 defines a threaded opening 31 for engaging the bolt 30. Typically, the bolt 30 and shaft 16 are threaded such that during operation, when the rotor 14 is spun, the bolt 30 is tightened. In another embodiment, the opening 29 is threaded and the shaft 16 has threads on its exterior surface so that the shaft 16 can be threadably received by the rotor 14. Those skilled in the art will recognize other ways of coupling the rotor 14 to the shaft 16, such as, but not limited to, pressing, brazing, welding, press-fit, using keys and keyways, splines, geometrically shaped shaft, set screws, clamping elements, bonded, and in addition, the shaft may be formed as part of the rotor, and all such ways of coupling are intended to be within the scope of the invention.

In alternative embodiments, the rotor 14 can be spherical or have an exterior surface of any other predetermined shape.

Typically, the boss 105 has an exterior 107 that is generally cylindrical shape that tapers inward to a flat head 109 for abutting against the bolt 30. The interior 111 of the boss 105 is adapted to receive the shaft 16 such that when the shaft 16 is beveled or tapered the interior 111 of the boss 105 is complementary configured.

In one embodiment, the rotor 14 is plastic and is formed using injection molding known to those skilled in the art. The rotor 14 can also be made from, but is not limited to, metal, which may be made using manufacturing methods such as, but not limited to, die-cast methods, or machining methods, among others known to those skilled in the art. The rotor 14 can also be made from ceramics using known methods or from other rigid materials.

The rotor 14 defines fluid passages 32 having walls 34. The fluid passages 32 extend outward from a first opening 36 to a second opening 38, which are disposed along the longitudinal exterior 26 of the rotor 14. The rotor 14 is illustrated as having multiple fluid passages 32 with second openings 38 approximately longitudinally aligned. A first set of fluid passages 32 proximal to the front face 22; a second set of fluid passages 32 proximal to the rear face 24; and a third set of fluid passages 32 interposing the first and second set of fluid passages. However, this is merely one embodiment, and in alternative embodiments, the rotor may more, fewer, or no sets of approximately longitudinally aligned second openings 38 or third openings.

The base portion 10 defines an exterior surface 50 and an interior surface 52 having an opening 54 formed therethrough. An outlet/inlet pipe 56 extends outward from the opening 54 and is in communication with the cavity 12. When fluid flows into the cavity 12 from an inlet/outlet pipe 48, the fluid flows out the outlet/inlet pipe 56.

The base portion 10 also includes a rear wall 11 and a longitudinal wall 101 having an inner surface 103. The rear wall 11 defines an opening 19, which extends through the rear wall 11. The opening 19 is adapted to receive the shaft 16 so that the shaft 16 can extend from the motive source 6 to the rotor 14.

The rotor 14 and cavitation housing 4 have an interstitial clearance 40 that is typically greater than (including magnitudes greater than, in some embodiments) approximately 0.005 inches. For the purposes of this disclosure, the interstitial clearance is defined as the distance between the longitudinal exterior surface 26 of the rotor 14 and the inner surface 103 of the longitudinal wall 101 of the base portion 14. The interstitial clearance 40 is typically large enough so that there is no fluid flow restriction, which might reduce the cavitation effect within the fluid passages 32. In some embodiments, the interstitial clearance 40 is on the order of multiple feet. For example, a roto-dynamic fluidic system for treating municipal waste waster may have interstitial clearances in the range of multiple feet. In addition, the interstitial clearance is typically large enough so that fluid disposed between the rotor 14 and the housing 4 is not generally cavitated by shear forces induced by spinning the rotor 14. Typically, the distance between the front and rear faces of the rotor is approximately the same as the interstitial distance 40.

The front plate 8 defines an exterior face 42 and an interior face 44 having an opening 46 formed therethrough. A fluid inlet/outlet pipe 48 extends outward from the opening 46 and partially into the cavity 12. Typically, the fluid inlet/outlet pipe 48 threadably mates with the opening 46. A fluid flows from a reservoir (not shown) through a hose or pipe, etc. (not shown) into the cavity 12. The inlet/outlet pipe 48 and the center void 28 are operationally aligned such that fluid flowing through the inlet/outlet pipe 48 flows into the center void 28 and, from there, through the fluid passages 32.

The front face 22 defines a notch 115 that circumscribes the center void 28. A sealing element 58 is pressed into the notch 115 and extends therefrom to the inlet/outlet pipe 48. The sealing element 58 provides an essentially fluid tight seal between the front plate 8 and the rotor 14 so that fluid flowing from the inlet/outlet pipe 48 is directed into the center void 28. Examples of sealing elements 18 and 58 include, but are not limited to, lip seals, carbon-element spring loaded seals, packing elements, labyrinth seals, etc.

For the purposes of this disclosure, the roto-dynamic fluidic device 2 will include three fluid regions: a central region (I); a peripheral region (II); and an intermediate region (III). In the embodiment illustrated in FIG. 1, the central region is defined by the inlet/outlet pipe 48, the sealing element 58, and the void 28. The peripheral region is the region between the interior surfaces 44 and 52 and the exterior of the rotor 14. The intermediate region is defined as the regions that fluidically connect the central region (1) with the peripheral region (II). If not for the passages 32, the sealing element 58 would essentially prevent proper fluidic communication between the central region (I) and the peripheral region (II).

In operation the roto-dynamic fluidic device 2 can be operated such that there is a pressure differential between the pressure of the fluid flowing through the inlet/outlet pipe 48 and the pressure of the fluid flowing out of the outlet/inlet pipe 56. When the pressure of the fluid in the inlet/outlet pipe 48 is beneath a given value, the given value depending upon the fluid, the fluid entering the roto-dynamic fluidic device 2 experiences tensile stress induced by the pressure "stretching" the fluid. Typically, the fluid is not "stretched" to the point that vapor bubbles will form in the fluid prior to the fluid beginning to flow through the passages 32. For a fluid such as water, the pressure at the inlet/outlet pipe 48 is typically within the range of 0 to 100 psi.

It should be noted that although the fluid flow into the roto-dynamic fluidic device 2 has been described as flowing from the inlet/outlet pipe 48, through the rotor 14, and out the outlet/inlet pipe 56 that this was done for exemplary purposes only. In another preferred embodiment, the fluid flow is reversed such that fluid flows into the roto-dynamic fluidic device 2 from the outlet/inlet pipe 56 and out the inlet/outlet pipe 48.

The rotor 14 is spun at rpm levels typically ranging from 70 to 65,000 rpm depending on the dimensional parameters of the rotor 14 itself and the fluid being cavitated. In operation, fluid flows into the passages 32 through the first openings 36 as the rotor 14 is being spun, and the fluid in the passages 32 experiences centrifugal force induced by the rotation of the rotor 14. The fluid within the passages 32 experience centrifugal force, which results in tensile stresses being developed in the fluid column present within the passage 32. Generally, the tensile stress serves as the primary or one of many components that cause vapor bubbles to form within the fluid. The fluid exits the passages 32, and generally the vapor bubbles collapse within the interstitial clearance 40. However, in some modes of operation, some or all of the vapor bubbles may collapse within the passages 32 prior to their exiting the passages 32. It should be also understood that, in other embodiments, when fluid flows radially inward (from the second openings 38 to the first openings 36) through the rotor 14, the fluid undergoes centripetal acceleration which creates a low pressure field proximate to the center of rotation, thereby promoting cavitation in the fluid.

Furthermore, it should be understood that although the first opening 36 and the second opening 38 of the passages 32 within the rotor 14 have been shown as being circular in cross section, this is simply in accordance with at least one embodiment. In alternative preferred embodiments, the cross section of the first openings 36, the second openings 38, and the passages 32 may be, but are not limited to, a circular, or square, or rectangular, or oval, or irregular shape. Furthermore, alternative preferred embodiments, the passages 32 are defined by walls 34 that may be diverging or converging or a combination of both, among others.

Although the motive source 6 is illustrated as being proximal to the cavitation housing 4, this is for illustrative purposes only and is a non-limiting example. In other embodiments, the shaft 16 having the rotor 14 coupled thereto can be powered by other sources such as, but not limited to, a belt, chain, gear, hydraulic, air, or similar drive means. In other embodiments of the invention, the motive force for the rotor 14 is provided through the provision within the rotor for it to also act as an armature for a brush-type or inductive electric motor with the corresponding components being provided within the housing 4. In other preferred embodiments of the invention, water pressure from an outside source is used as the motive force for the rotor 14 through the use of a water driven turbine connected rotationally to the rotor 14 of the roto-dynamic fluidic device 2. In some implementations of the invention, it is advantageous to use a magnetic bearing to reduce the frictional losses within the roto-dynamic fluidic device 2. In other implementations of the invention, the rotor 14 is supported by the fluid within the housing 4 by a hydrodynamic bearing through the dimensional configurations of the rotor and housing construction. Furthermore, in other implementations, the roto-dynamic fluidic device 2 may act as both a turbine and a cavitation facilitator.

In an alternative embodiment, the roto-dynamic fluidic device 2 includes a hollow rotatable shaft (not shown) that extends through the opening 46. The hollow shaft is supported by a support bearing (not shown), and a sealing element (not shown) abuts the hollow shaft and the interior face 44 of the front plate 8. The hollow shaft is coupled to the rotor 14 pressing the hollow shaft into the void 28. Those skilled in the art are familiar with other ways of coupling the hollow shaft to the rotor 14, and the other ways are included within the scope of the invention.

In yet another embodiment, the shaft 16 is a through shaft that extends through the rotor 14. In this case, the front plate 8 may also include a support bearing for supporting the through shaft. As those skilled in the art will recognize, a through shaft can also have a hollow interior, and if the through shaft defines a hollow interior for communicating fluid into (or out of) the roto-dynamic fluidic device 2, then the through shaft includes ports for communicating fluid. In some embodiments, a through shaft may be used to communicate a first fluid from one end of the through shaft into the roto-dynamic fluidic device 2 and a second fluid or gas or gaseous-fluid mix into the roto-dynamic fluidic device 2. The ports in the through shaft may be located such that one of the fluids is communicated between the center void 28 and the through shaft and the second fluid is communicated between the region that is exterior to the rotor 14 and the through shaft such that the fluids mix after cavitation. Alternatively, the ports can be disposed on the through shaft such that the two fluids mix prior to or during cavitation.

In yet another embodiment, the inlet/outlet pipe 48 can include a plurality of tubes such that multiple fluids, gases, types of particulate matter, etc. can be injected into the roto-dynamic fluidic device 2. The tubes can be co-axial, and the tubes can be used to inject the substances into different regions of the roto-dynamic fluidic device 2 such that mixture can occur before, during, or after cavitation.

In some embodiments of the invention, the cavitation housing 4 is an open structure presented to the rotor 14 such that fluid can flow into and out of the interior cavity 12 of the cavitation housing 4. In some implementations of this embodiment, the rotor 14 is immersed in an open reservoir, wherein the fluid enters the center void 28 of the rotor and exits the passages 32 via the second opening 38.

The roto-dynamic fluidic device 2 preferably provides for controlled cavitation such that when vapor bubbles collapse, the vapor bubbles collapse in predetermined zones such that the mechanical components of the roto-dynamic fluidic device 2 are not harmed. Typically, this is accomplished by providing for substantial laminar flow between the first opening 34 and the second opening 38 or the passage 32. Generally, in some embodiments, if the passages 32 are narrow or any portion of a passage is narrow, then the walls 34 of that portion are smooth so as to facilitate laminar fluid flow. Alternatively, in portions of the passages 32 that are wide, the walls can be rough. Fluid flowing in a wide passage having a rough wall can form a turbulent boundary layer proximal to the rough wall, which promotes vapor bubble travel within the flow field region away from the walls.

The following figures illustrate, alternative embodiments, among others, of the rotor 14. The following embodiments are intended to be non-limiting and are provided for, among other things, exemplary purposes.

Figure 3A:
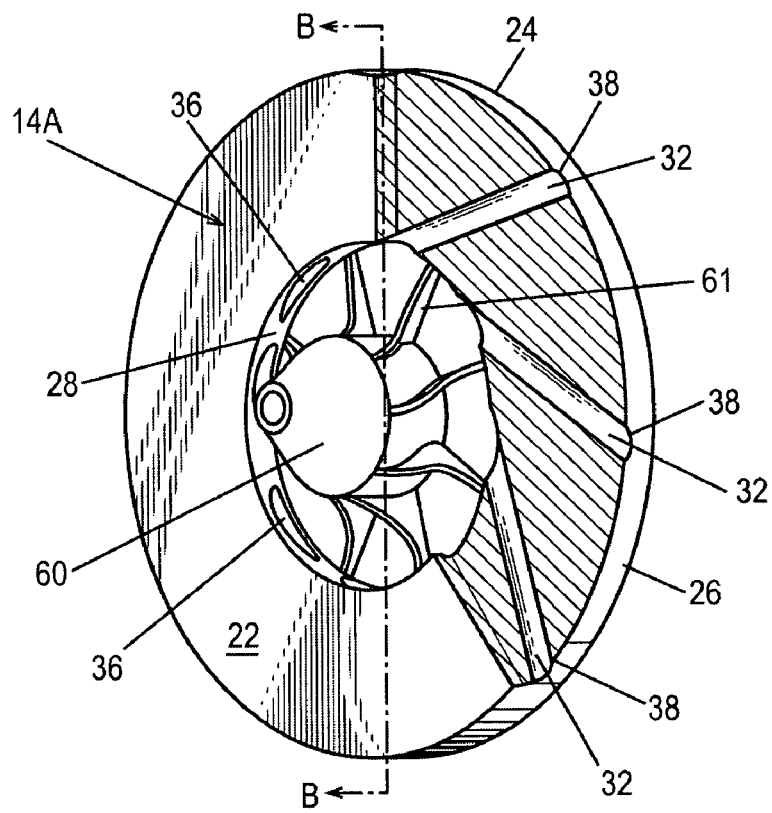
FIG. 3A is an perspective view with a partial cut away of a rotor.
Figure 3B:
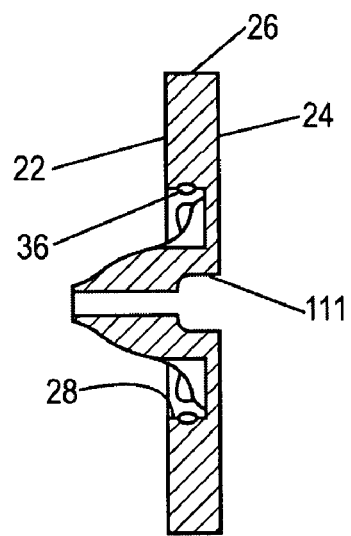
FIG. 3B is an cross sectional view of a rotor.

FIG. 3A shows a perspective cutaway view of a rotor 14A having an inducer 60, which is disposed within a center void 28, and FIG. 3B shows the rotor 14A in cross section as seen from line B—B. The inducer 60 aids the transition of the fluid flow from longitudinal to radial. The inducer 60 includes vanes 61 that extend outward from the center of the inducer 60. The inducer 60 and rotor 14 spin as one element on the shaft 16 (not shown, but the shaft is connectable to the rear of the rotor 14A, as with the boss 105 illustrated in FIG. 2A), and the vanes 61 impart rotational momentum to the fluid in the center void 28, which enhances fluid flow from the center void 28 into the first openings 36 of the passages 32. The passages 32 extend non-radially from the center void 28 to the exterior surface 26. However, the passages 32 could also extend radially from the center void 28 to the exterior surface 26. In various embodiments, passages 32 are preferably circular cylindrical but could be otherwise in other embodiments. In other embodiments, an inducer may be formed by passages formed to impart rotational momentum to the fluid.

Figure 3C:
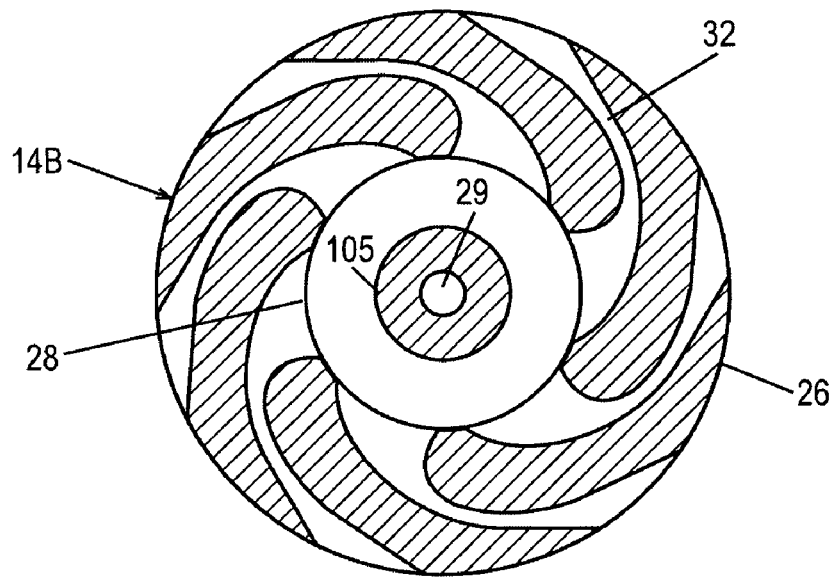
FIG. 3C is an cross sectional view of a rotor.

Refer to FIG. 3C, which is cross sectional view of another embodiment of a rotor 14B, the rotor 14B defines passages 32 that are formed along a curved or irregular path. Preferably, the curvature of the passages 32 is such that when fluid flows through the passages 32, the fluid helps rotate the rotor 14c.

Figure 3D:
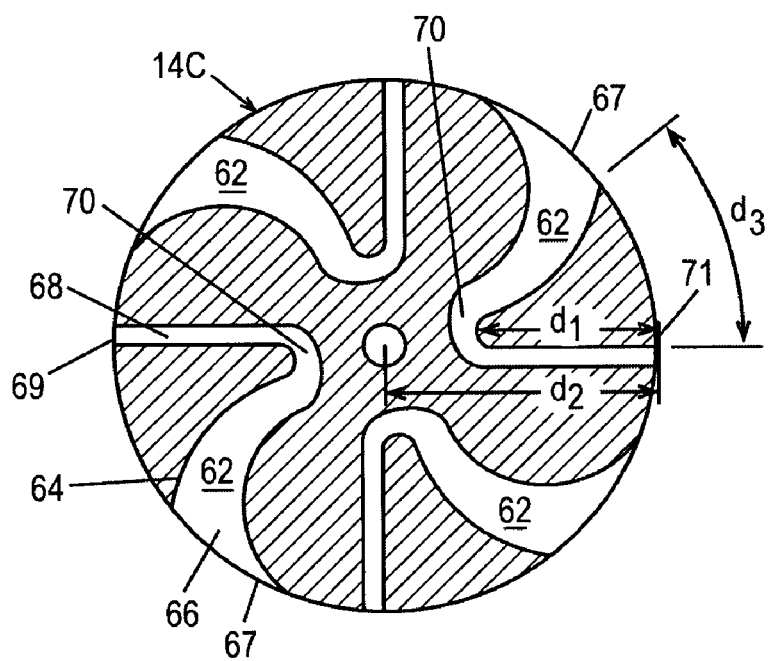
FIG. 3D is an cross sectional view of a rotor.

Refer to FIG. 3d, which is cross sectional view of another embodiment of a rotor 14C, the rotor 14c defines a plurality of fluid passages 62 having walls 64. Each of the fluid passages 62 includes a feed passage 66 having an inlet opening 67 and a cavitation passage 68 having an outlet opening 69. The feed passage 66 is formed at an angle with respect to the normal of the outer surface 26 of the rotor 14 and extends partially inward towards the center of the rotor 14. At the inner most portion 70 of the fluid passage 62, the feed passage 66 communicates with the cavitation passage 68. The cavitation passage 68 extends from the inner most portion 70 to the exterior surface 26 of the rotor 14c. In operation, the spinning rotor 14c allows fluid to flow from the interstitial clearance 40 down the feed passage 66 and out the cavitation passage 68 back to the interstitial clearance 40. As fluid flows through the cavitation passages 68, the fluid experiences tension, thereby producing cavitation in the fluid. The cavitation passage 68 can extend radially or non-radially from the inner most portion 70 to the surface 26. In addition, it is preferable that the minimum distance $(d_1)$ between the inner most portion 70 and a given point 71 on the exterior surface 26 be less than the minimum distance ($d_2$) between the center of rotation 73 of the rotor 14c and the given point on the exterior surface 26, where the given point 71 lies upon the shortest line on the surface ($d_3$) extending between the inlet opening 67 and the outlet opening 69.

In alternative embodiments, the fluid passages 62 can include a longitudinal component. For example, for a given fluid passage 62, the feed passage 66 could. extend tangentially inward (toward the shaft 16) and rearward (toward the rear face 24) to the inner most portion 70, and the cavitation passage 68 would extend outward from the inner most portion 70 back to the exterior surface 26. The cavitation passage 68 could also include a longitudinal component such that the cavitation passage 68 could extend both outward from the inner most portion 70 and toward either the front face 22 or the rear face 24.

Figure 4A:
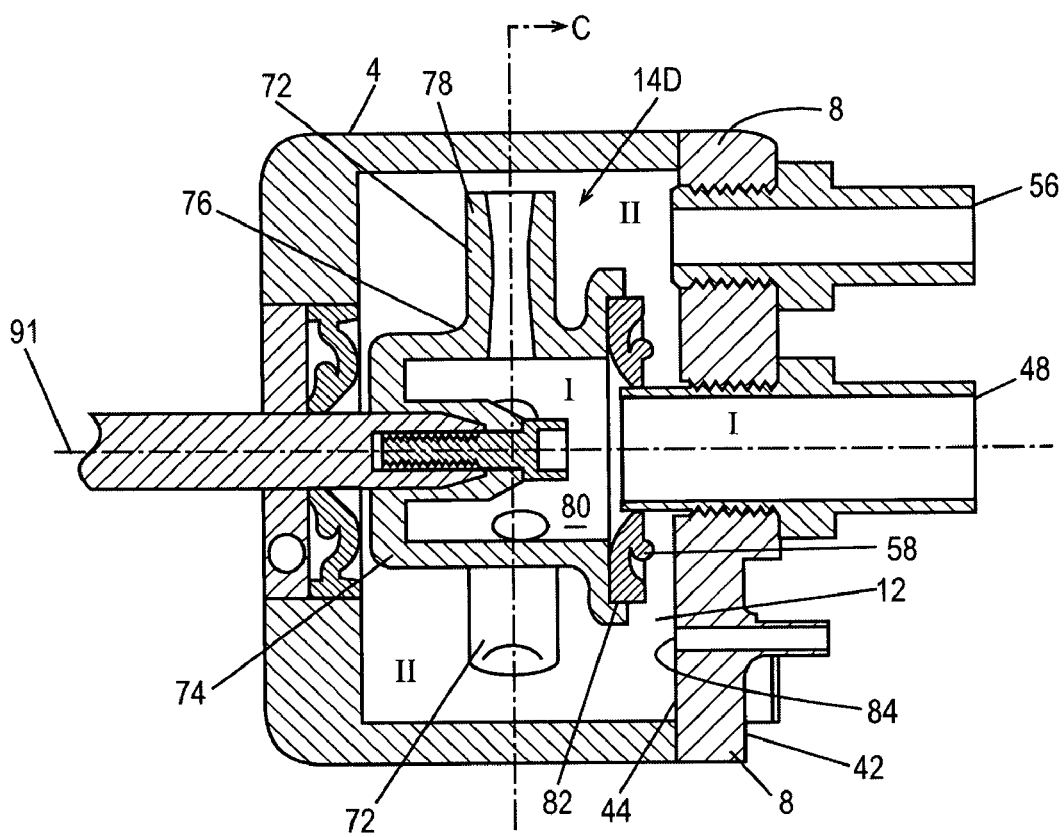
FIG. 4A is an cross sectional view of a roto-dynamic fluidic device.
Figure 4B:
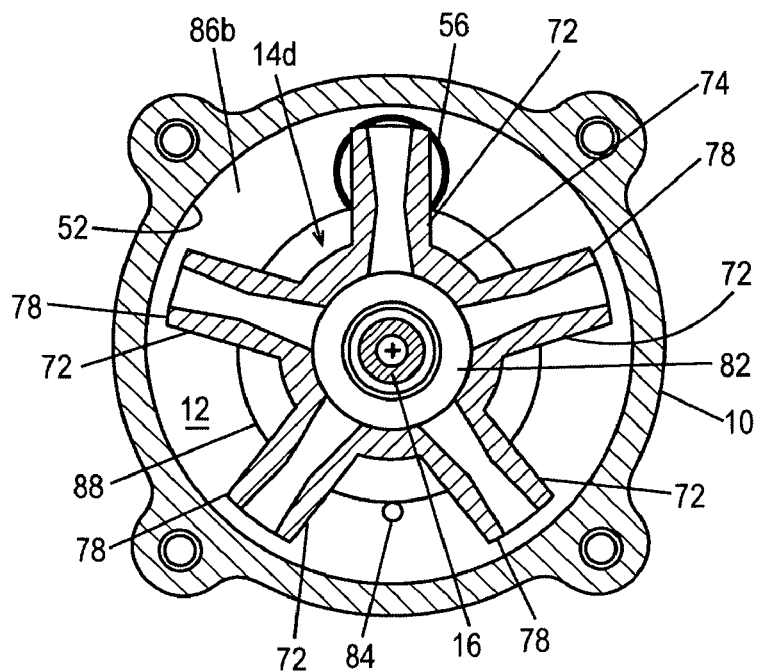
FIG. 4B is an cross sectional view of a roto-dynamic fluidic device.

Refer to FIG. 4A and FIG. 4B, in FIG. 4A the housing 4 and a rotor 14D are shown in cross section, and in FIG. 4B the housing 4 and the rotor 14D are shown in cross section as viewed from line C—C. The rotor 14D comprises a hub 74 and a plurality of hollow tubes 72 that extend outward from the hub 74. Each of the tubes 74 is defined by a proximal end 76 and a distal end 78, relative to the hub 74. The hub 74 defines a generally hollow interior 80 for receiving a fluid via the inlet/outlet pipe 48. In this embodiment, the inlet/outlet pipe 48 extends partially into the cavity 12, and the sealing element 58 extends from a notch 82 formed in the hub 74 to the inlet/outlet pipe 48. In this embodiment, the peripheral region (II) includes all of the volume of the cavity 12 outside of the rotor 14 and the inlet/outlet pipe 48. The central region (I) is defined by the volume of the inlet/outlet pipe 48 and the hollow interior 80 of the hub 74.

The front face 22 defines a discharge port 84 that extends from the interior face 44 to the exterior face 42. The discharge ports 84 enable excess fluid to be discharged from the roto-dynamic fluidic device 2. In this embodiment, the front face 22 also defines an opening for receiving an outlet/inlet pipe 56.

Refer to FIGS. 4B, a fluid 86A flows into the hollow interior 80 of the hub 74 via the inlet/outlet pipe 48 and through the tubes 72 into the cavity 12. The spinning of the rotor 14d causes the fluid 86b in the cavity 12 to spin in conjunction with the rotor 14d. Thus, the spinning fluid 86b experiences centrifugal force, which causes it to push against the interior face 52 of the base portion 10 away from the center of rotation, which for the present embodiment is shaft 16. Fluid that cannot move proximal to the interior face 52 is drained from the cavity 12 via the discharge ports 84. Due to the centrifugal force experienced by the spinning fluid 86b, a pressure gradient develops across the spinning fluid. Maximum pressure is experienced at the interior face 52 of the base portion 10 and decreases radially inward toward the axis of rotation. The spinning liquid 86b defines a liquid ring that extends from a fluid-vapor boundary 88 to the interior face 52. Typically, the rotational speed of the rotor 14 and the locations of the discharge ports 84 are such that the pressure acting on the fluid at the fluid-vapor boundary 88 is approximately the vapor pressure of the fluid.

In operation, the distal ends 78 are immersed in the fluid ring 86b, and fluid 86c in the tubes 72 experiences tensile stress as the rotor 14d is rotated, thereby causing the formation of vapor bubbles in the fluid in the tubes 72. The vapor bubbles formed by tensile stresses acting on the fluid within the tubes 72 are exposed to the high pressure fluid 86b when the fluid 86c exits the distal end 78 of the tubes 72. The high pressure fluid 86b enhances the collapsing of the vapor bubbles.

Figure 4C:
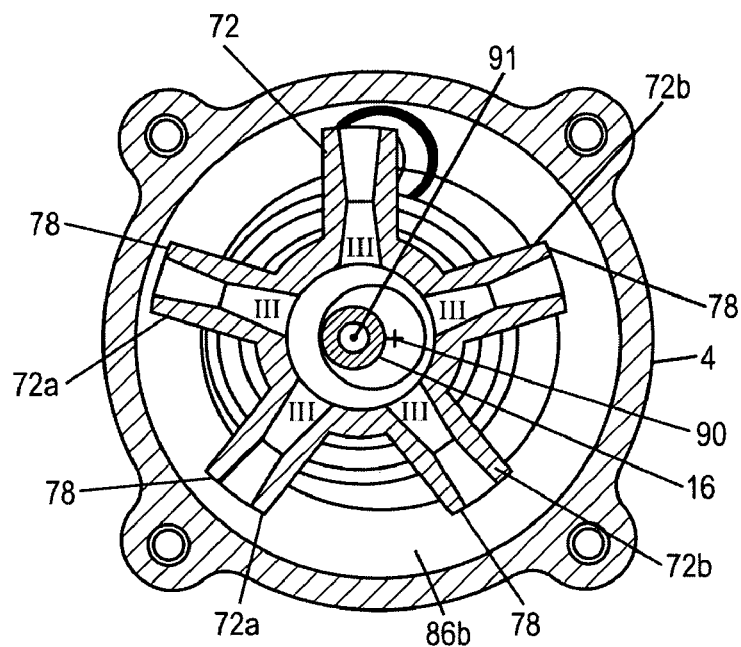
FIG. 4C is an cross sectional view of a roto-dynamic fluidic device.

Refer to FIG. 4C, in this embodiment, the housing 4 defines a longitudinal center 90, and the shaft 16 is offset from the longitudinal center 90. The shaft 16 defines a center of rotation 91 that is offset to the left from the longitudinal center 90, and consequently, the tubes 72a that are currently in the left half of the housing 4 extend deeper into the fluid ring 86b than do the tubes 72b that are currently in the right half of the housing 4. In this embodiment, the fluidic pressure exerted on a vapor bubble exiting the distal end 78 of a tube 72 depends upon the instantaneous position of the distal end 78.

Figure 5:
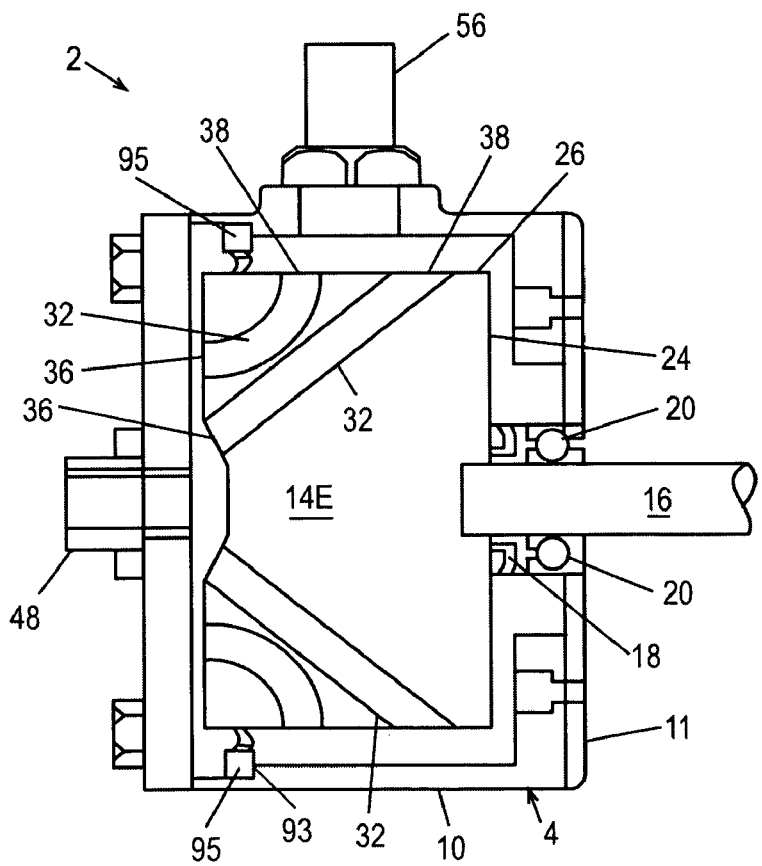
FIG. 5 is an cross sectional view of a roto-dynamic fluidic device.

Refer to FIG. 5, which shows the housing 4 and a rotor 14E in cross sectional view, the rotor 14E includes a plurality of passages 32 having first openings 36 disposed front face 22 of the rotor 14E and second openings 38 disposed on the longitudinal surface 26. The interior surface 52 of the base portion 10 defines a notch 93 that extends circumferentially around the rotor 14E. A sealing element 95 extends from the base portion 10 to the longitudinal surface 26. Here, region I is defined to include the inlet/outlet pipe 48 and the volume of space between the interior face 42 of the front plate 16 and the sealing element 58 and the front face 22 of the rotor 14E. Region III is defined as the volume behind the sealing element 95. The passages 32 define region II, and the passages 32 include both straight and curved passages. In one preferred implementation, fluid flows into Region I of the roto-dynamic fluidic device 2, through region II into region III, and from region III out of the roto-dynamic fluidic device 2. In another implementation, the fluid flow is reversed. The spinning of the rotor 14E induces tensile stress in fluid within the region II, thereby causing vapor bubble formation in the fluid therein.

Figure 6:
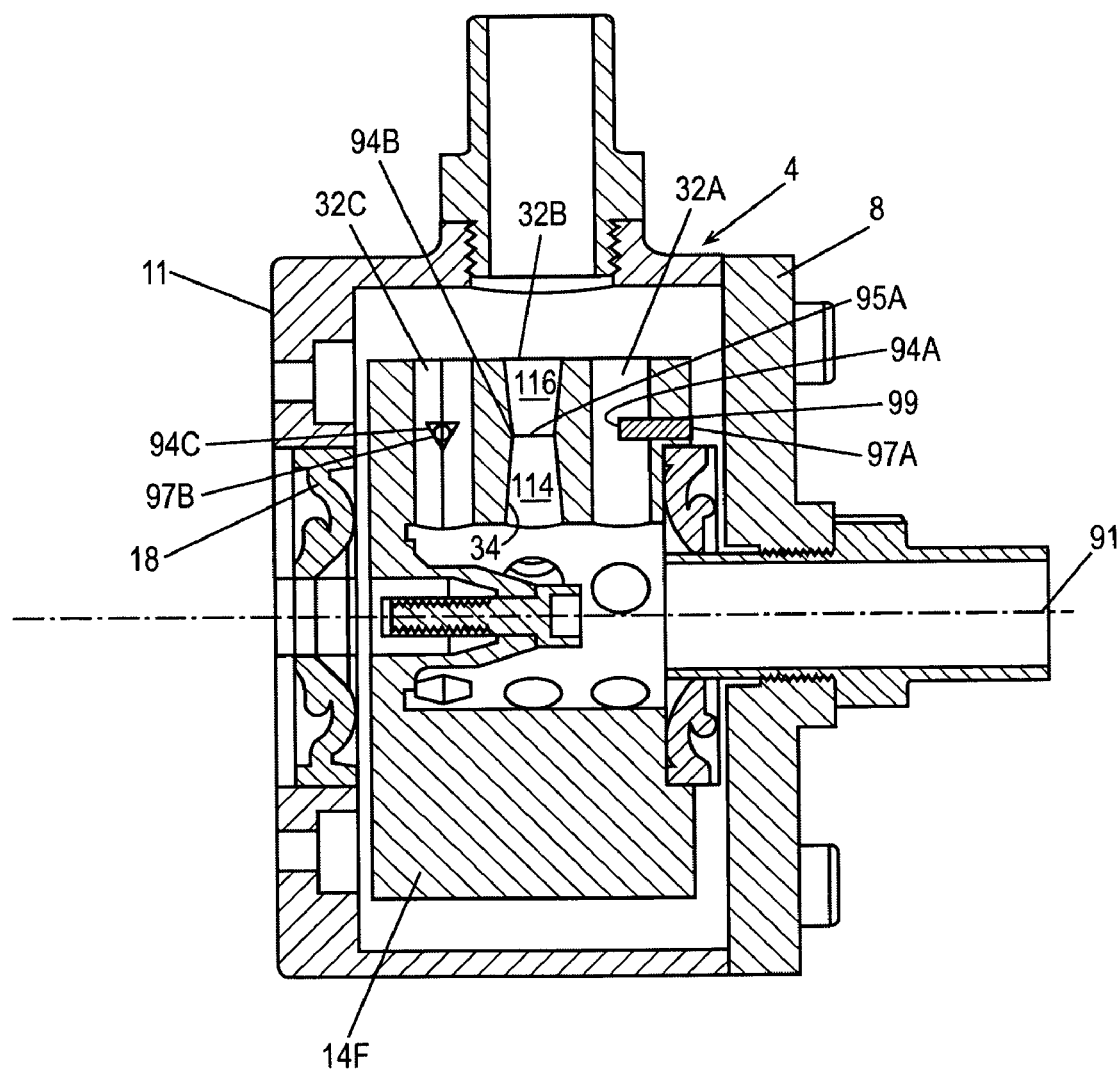
FIG. 6 is an cross sectional view of a roto-dynamic fluidic device.

Refer to FIG. 6, FIG. 6A shows the housing 4 and a rotor 14F in cross section. The rotor 14F defines passages 32A–32C, each of the passages 32 have a restrictive section 94A–94C, respectively, where a restrictive section is defined as a region having a relatively narrow cross section or having an obstruction therein. Typically, the restrictive section 94 is the narrowest region along the length of the passage 32 and is typically narrower than the cross sections of the first opening 36 and the second opening 38. The flow area for the fluid is reduced at the restrictive section 94 which results in an increase in the velocity of the fluid in the restrictive section 94. As the fluid has passes through the restrictive section 94, the fluid experiences a drop in local fluid pressure. This pressure reduction in cooperation with the tensile stresses already present in the liquid act to cause the fluid to form vapor bubbles which typically collapse after passing through the restrictive section 94, thereby completing the cavitation process. The region upstream from the restrictive section 94 is defined as the converging section 114, and the region downstream from the restrictive section is defined as the diverging section 116. The restrictive section 94 may be placed anywhere along the passages 32, but it is preferably located proximal to the second opening 38. In some embodiments, the diverging section 116 may be eliminated and the passage 32 can discharge directly into the interstitial region 40. The vapor bubbles typically collapse because the pressure partially recovers after the restrictive section 94 as the fluid enters the diverging section 116.

In passage 32A, the restrictive section 94A is defined by a pin 97A that extends from the front face 22 through a hole 99 into the passage 32A. Typically, the pin 97A is pressed into the hole 99, but the pin 97A can also be welded, threaded, glued or otherwise affixed to the rotor 14F.

In passage 32B, the restrictive section 94B is defined by the walls 34 tapering inward in a converging section 114 to a minimum clearance section 95a and then tapering outward as the diverging section 116.

The passage 32C is hexagonal in cross section, and the restrictive section 94C is defined by a triangularly shaped pin 97B. The pin 97B extends from the rear face 24 through a hole (not shown) into the passage 32C. The pin 97C is pressed into the hole, but the pin 97B can also be welded, threaded, glued or otherwise affixed to the rotor 14F.

In one preferred implementation, there are a series of restrictive sections 94 placed in succession to one another to process the working fluid multiple times. Ports and passageways can be provided for the introduction or removal of elements at given points in the process to affect chemical and physical reactions. The multiple restrictive sections 94 are placed linearly one after the other inside the passageways 32 which are used to direct the fluid from one pressure reduction section to the next.

In passage 32c, the restrictive section 94c is defined by one or more restrictive elements 94 placed in the passage 32c. Non-limiting examples of a restrictive element 94 include a cylinder and other geometrical objects whose cross-sectional area is smaller than the passageway's flow area at the point of insertion such that the fluid is forced through a narrower passage as it passes the restrictive element.

In some preferred implementations there may be provided a moveable restrictive element 94 placed at a chosen location within the fluid passage and held in place by the flow field acting on the exterior surfaces of the moveable restrictive element. In other implementations of the invention the moveable restrictive elements 94 may be acted upon by centrifugal or centripetal force which serve to close off the passageway but are prevented from totally shutting off the flow due to the external geometry of the restrictive element 94, thus providing a changeable means of decreasing the fluid flow area at a chosen point in the passageway and increasing the fluid velocity in this region. In other preferred embodiments the moveable restrictive element 94 may be affixed to a spring or springing medium such that the force of the spring acting on the restrictive element acts to maintain a near-constant pressure or flow within the passageway, such as is known to those skilled in the art. In other preferred embodiments the moveable restrictive element 94 may be vibrated at a chosen frequency to impart cyclic pressure fluctuations in the fluid, such as is known to those skilled in the art.

In this embodiment, the front 22 of the rotor 14 defines a notch 97 that circumscribes the center void 28 and has the sealing element 58 affixed thereto. The sealing element 58 extends from the notch 82 to the inlet/outlet pipe 48, which extends partially into the cavity 12 and partially past the front 22 of the rotor 14.

Here, region I is defined to include the inlet/outlet pipe 48 and the center void 28. Region III is defined as the volume between interior of the housing 4 and the rotor 14f and the inlet/outlet pipe 48. The passages 32 define region II, and the passages 32 include both straight and curved passages. In one preferred implementation, fluid flows into Region I of the roto-dynamic fluidic device 2, through region II into region III, and from region III out of the roto-dynamic fluidic device 2. In another implementation, the fluid flow is reversed. The spinning of the rotor 14F induces tensile stress in fluid within the region II, thereby causing vapor bubble formation in the fluid therein.

Figure 7:
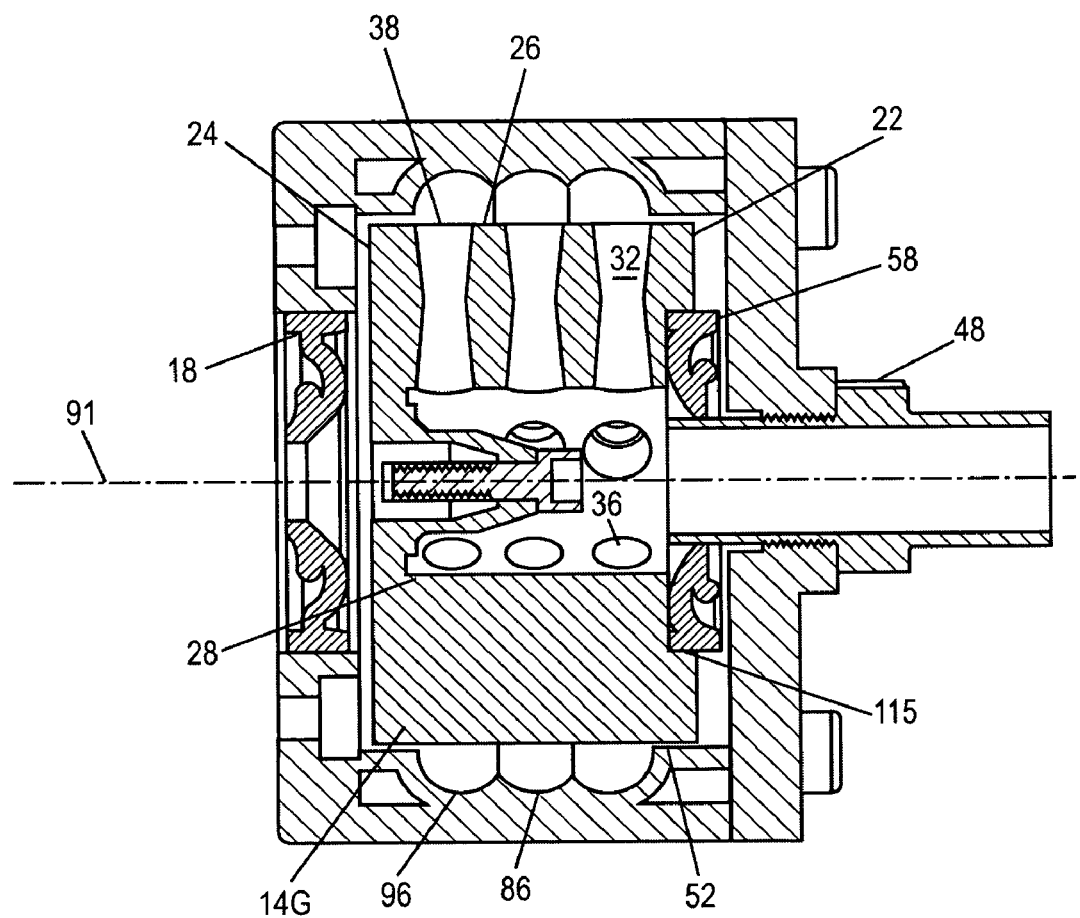
FIG. 7 is an cross sectional view of a roto-dynamic fluidic device.

Refer to FIG. 7, which shows the housing 4 and a rotor 14G in cross section, the interior face 52 of the housing 2 defines multiple circumferential troughs 96. The design of the circumferential troughs 96 is such that the fluid exiting the rotor 14G fills the troughs 96 and is brought into rotation around the inside of the cavitation housing 4 by the motion of the rotor 14. A rotating fluid ring 86 forms within the circumferential trough 96 and fluid pressure builds up within the trough 96 in relation to the speed of the rotor. The pressure of the fluid within the trough 96 is higher than the pressure of the fluid in the passages 32, and the higher pressure facilitates the violent collapse of vapor bubbles. The liquid ring 86 is driven into rotation by the shearing action of the rotor against the fluid within the housing, and the whirling effect of the fluid exiting the passageways.

Figure 8:
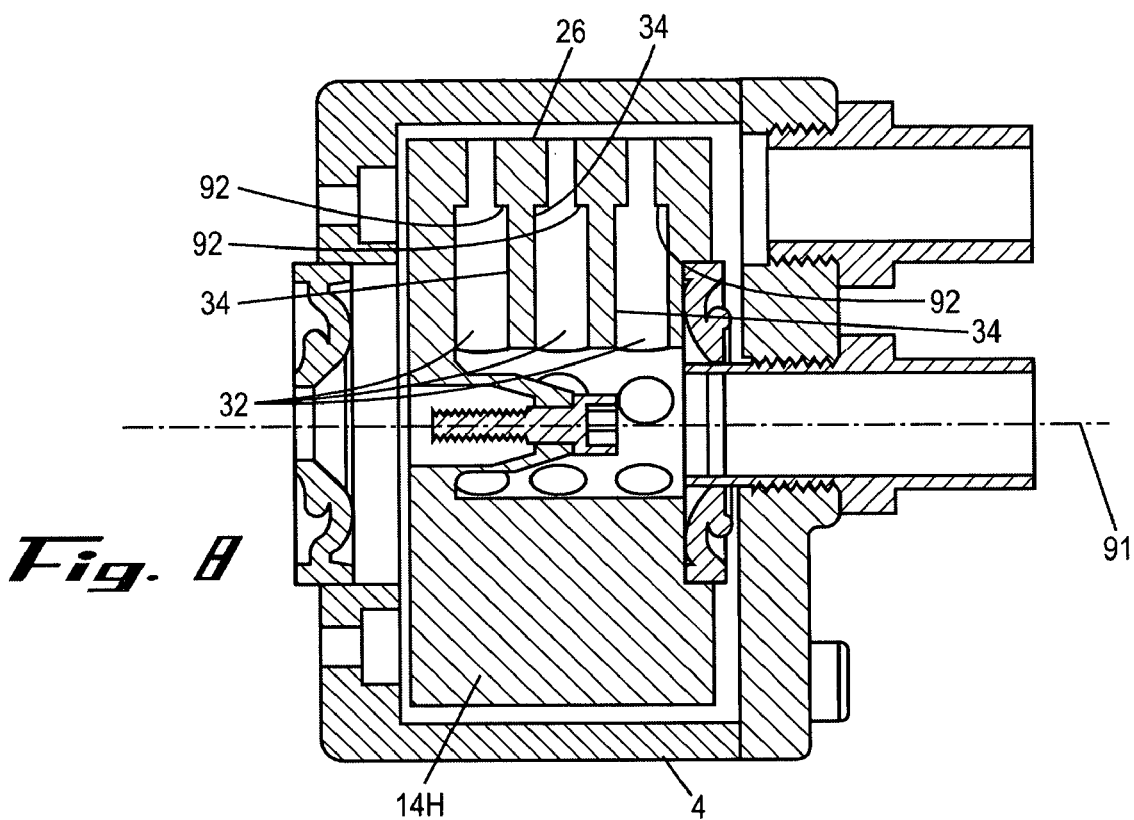
FIG. 8 is an cross sectional view of a roto-dynamic fluidic device.

Refer to FIG. 8, which shows the housing 4 and a rotor 14H in cross section, the rotor 14H includes passages 32, which have a restrictive section 94. In this embodiment, the width between the walls 34 of the passages 32 abruptly narrows in a step like manner at the beginning of the restrictive section 94, and the restrictive section 94 ends at the exterior surface 26. Thus, as the fluid flows out of the passages 32, the fluid is no longer confined by the restrictive section 94. In other words, the interstitial region 40 is a diverging section where cavitation occurs. In other implementations, the diverging section 116 may be provided within the passage 32.

Figure 9:
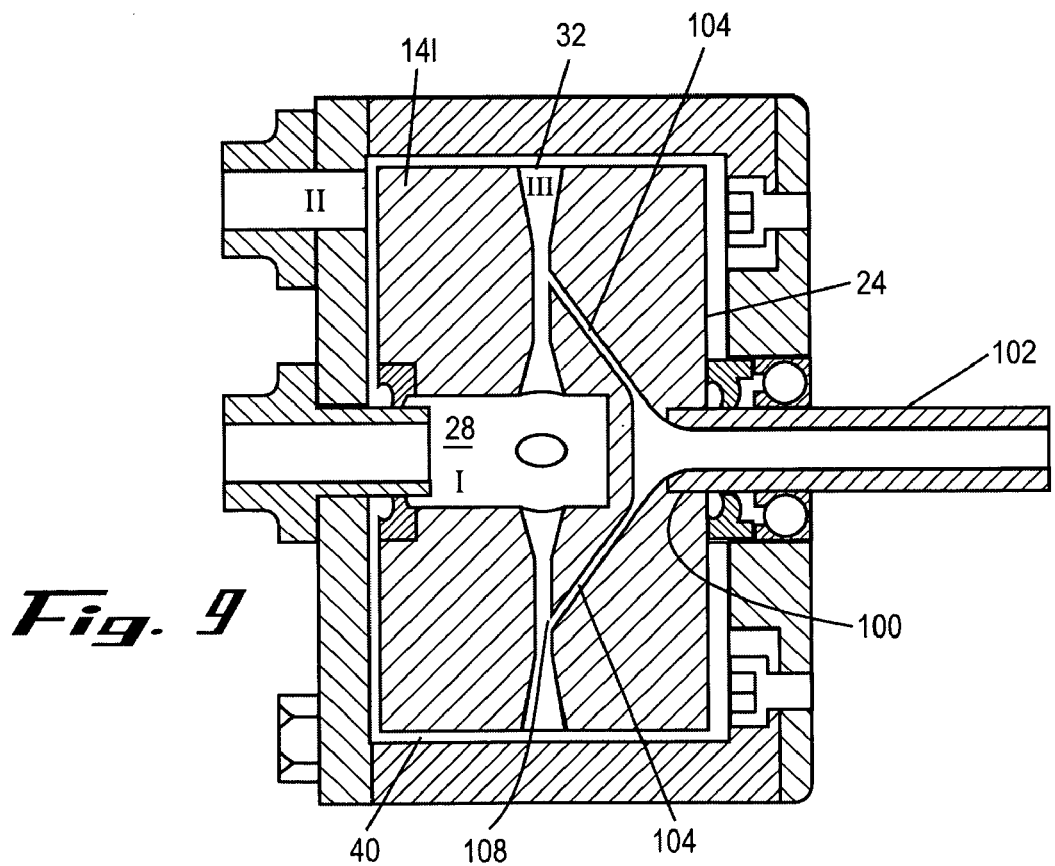
FIG. 9 is an cross sectional view of a roto-dynamic fluidic device.

Refer to FIG. 9, which shows a cross sectional view of the housing 2, a hollow shaft 102, and a rotor 14I, the rear 24 of the rotor 14I defines an opening 100 for receiving the hollow shaft 102. Typically, the opening 100 is configured to receive the hollow shaft 102 such that when the shaft 102 is pressed onto the rotor 14I, the hollow shaft 102 and rotor 14 move as one element. The rotor 14I includes a plurality of channels 104 that extend outward from a cavity 106, which is in fluidic communication with the hollow shaft 102. Each one of the channels 104 intersects and is in fluidic communication with one of the passages 32 at an intersection point 108.

In operation, the center void 28 receives a first fluid 86d via the inlet/outlet pipe 48, which then flows towards the interstitial region 40 via the passages 32. The hollow shaft 102 communicates a second fluid 86e into the cavity 106, and the second fluid then flows through the channels 104 to the intersection points 108. At each intersection point 108, the first fluid 86d and the second fluid 86e mix together and the resultant fluid 86f discharges into the interstitial region 40. It should be noted that having the intersection point 108 in proximity to the restrictive section 94 enhances mixing because of the energitics of the destruction of the vapor bubbles formed in the restrictive section 94. However, in alternative embodiments, the intersection point 108 may be before or after the restrictive section 94.

Figure 10A:
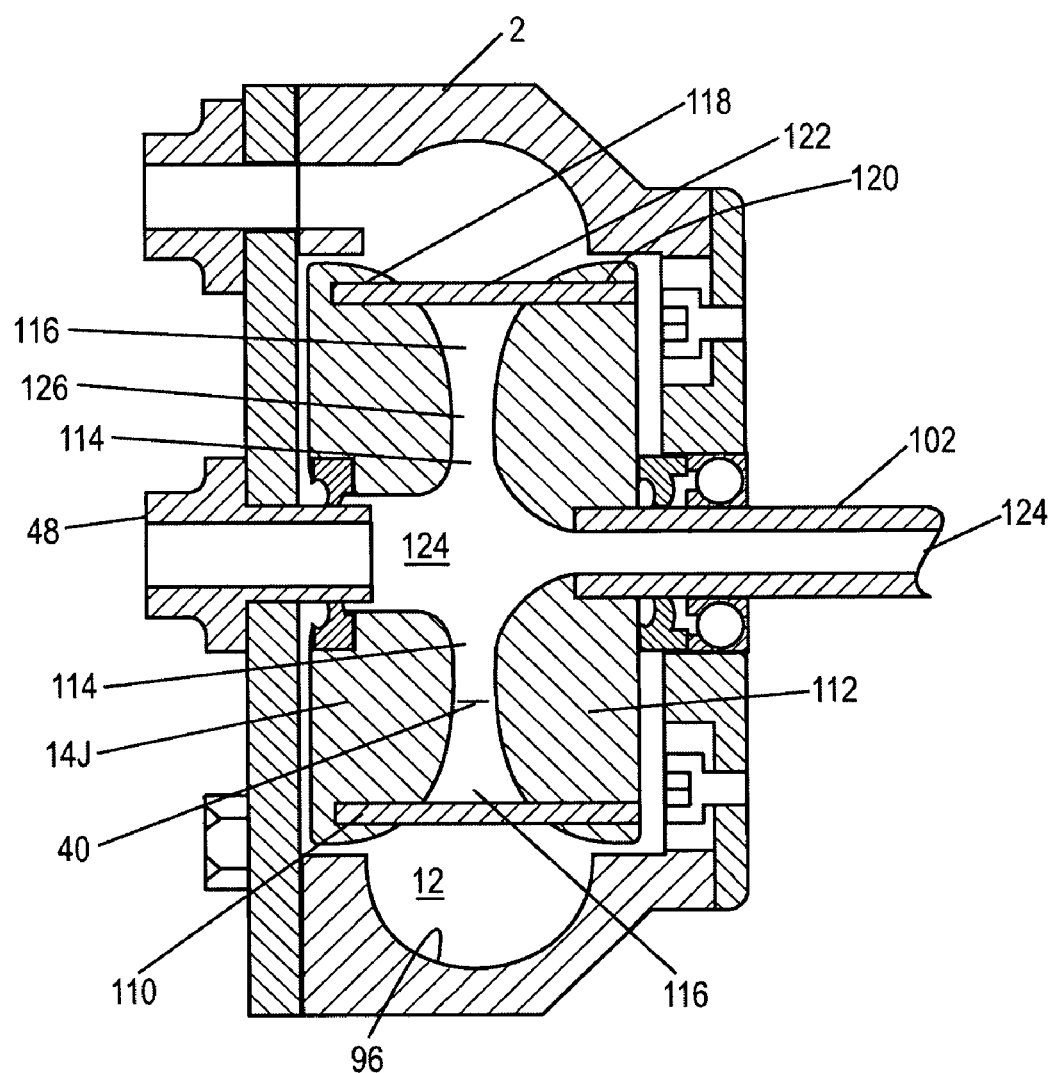
FIG. 10A is an cross sectional view of a roto-dynamic fluidic device.

Refer to FIG. 10A, which shows a cross sectional view of the housing 2, the hollow shaft 102, and a rotor 14J, the rotor 14J is comprised of a front section 110 and a rear section 112 whose cross sections form a converging section 114 and diverging section 116 in passage 32. The interstitial clearance 40 between rotor front section 110 and rotor rear section 112 is typically greater than 0.010 inches to prevent fluid friction from "choking" the device. The front section 110 and rear section 112 each define a plurality of aligned pairs holes 118 and 120, respectively, and each pair of aligned holes is for receiving a connecting member 122. The connecting members 122 extend rigidly between the front section 110 and the rear section 112 such that the front section 110x and rear section 112 rotate as essentially one element. The connecting members 122 are formed in a manner such that they do not substantially block fluid flowing from region I to region II. Non-limiting examples of connecting members 122 include rods, pins, bolts, and the like.

Together the front section 110 and the rear section 112 define a cavity 124 that is in fluid communication with the inlet/outlet pipe 48 and the hollow shaft 102. A first fluid 86d is passed into the cavity 124 of the rotor 14J via the inlet/outlet pipe 48. Another fluid 86e is passed into the cavity 124 of the rotor 14J via the hollow shaft 102, and the two fluids are mixed in the passage 32. The mixed fluid 86f exits the passages 32 into the cavity 12.

In this embodiment, the rear section 112 is attached to the shaft 102 by aligning the opening 100 with the shaft 102 and pressing the rear section 112 onto the shaft 102. Those skilled in the art will recognize other ways of coupling the shaft 102 and the rear section 112 such as, but not limited to, the ways previously described hereinabove, all of which are included within the scope of the invention.

For operation with a single fluid, the fluid experiences centrifugal force as the fluid is spun because the fluid in the rotor spins in conjunction with the rotor. The rotational movement of the fluid results in tensile stresses being developed in the fluid. The converging section 114 leads to a minimal clearance section 126 which results in an increase in the velocity of the fluid, thereby reducing the local fluid pressure. This pressure reduction in cooperation with the tensile stresses already present in the liquid act to cause the fluid to form vapor bubbles which collapse in the diverging section 116 of the passage 32 downstream of minimal clearance section 126, wherein the pressure partially recovers, completing the cavitation process. The same process applies when two fluids are mixed.

In this embodiment, the base portion 10 also defines a single circumferential trough 96. In operation, the fluid 86f in the trough 96 experiences centrifugal force as the rotor 14J is spun. As previously described hereinabove, the pressure on the fluid 86f in the trough 96 is higher than the pressure on the fluid in the diverging section 116 of the rotor 14J, and the pressure on the fluid in the diverging section 116 is less than the pressure on the fluid in the converging section 14J. The local pressure reduction in the diverging section 116 along with the tensile stresses already present in the fluid (the tensile stresses being due to the fluid's rotational movement imparted by the rotor) act to cause the fluid to form vapor bubbles. Some of the vapor bubbles collapse in the diverging section 116 of the passage 32 downstream of minimal clearance section 126. Bubbles that do not collapse in the rotor 14J are directed by fluid flow and radial momentum into the relatively higher pressure zone of the circumferential trough 96, and the increase in pressure as the bubbles move from the lower pressure diverging section 116 into the higher pressure circumferential trough 96 enhances the destruction of the bubbles in the trough 96.

Figure 10B:
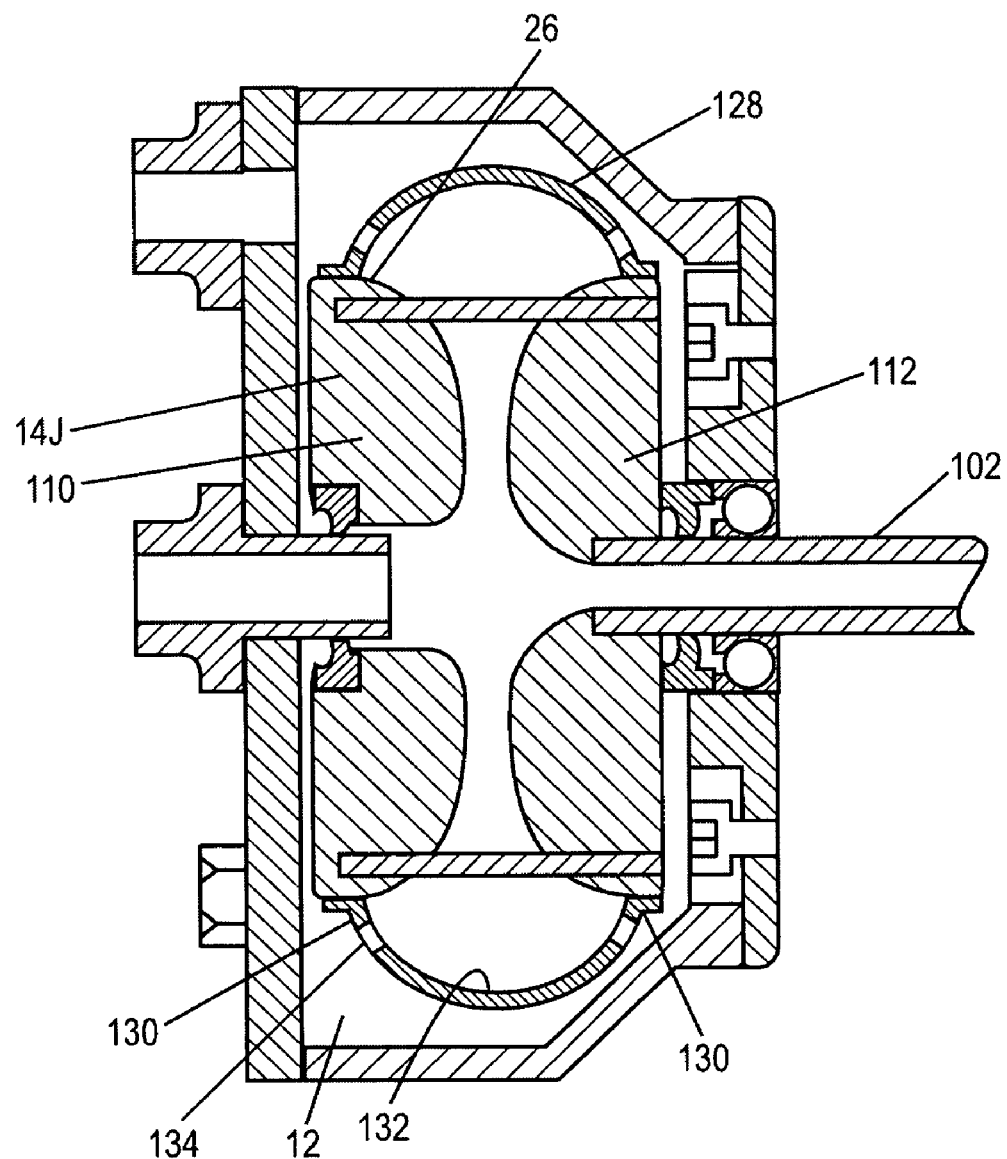
FIG. 10B is an cross sectional view of a roto-dynamic fluidic device.
Figure 10C:
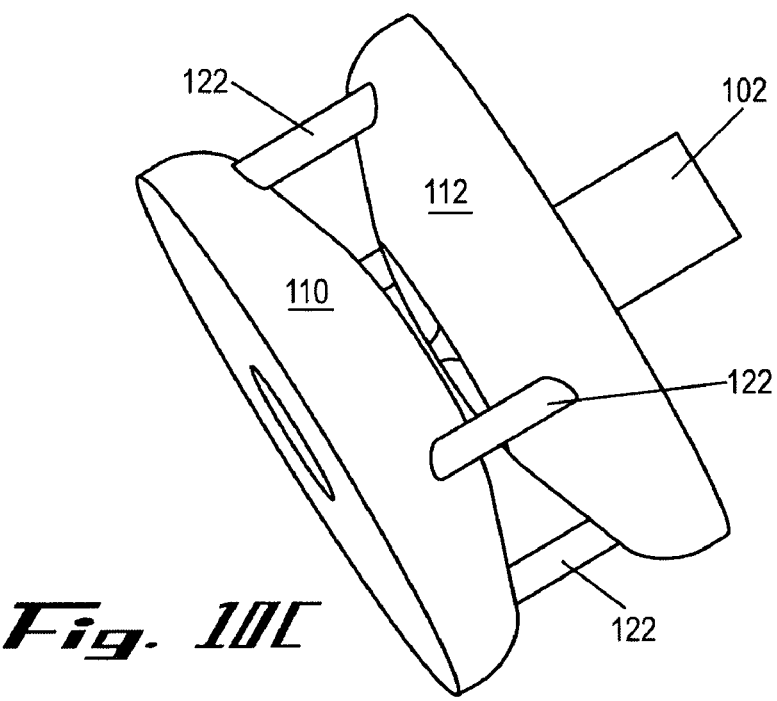
FIG. 10C is a perspective view of a rotor.

Refer to FIGS. 10B and 10C, FIG 10B shows a cross sectional view of the housing 2, the hollow shaft 102, the rotor 14J, and a volute ring 128, and FIG. 10C shows an isometric view of the rotor 14J. The volute ring 128 is attached to the front section 110 and rear section 112 and spins in conjunction with the front section 110 and rear section 112. In cross section, the volute ring 128 includes opposed ends 130 and a peak region 132 that is approximately half-way between the opposed ends 130. The opposed ends 130 are attached to the front section 110 and rear section 112 such that the peak region 132 is approximately aligned with the passage 32. Typically, the opposed ends 130 are attached by fasteners and/or adhesives such as, but not limited to, screws, bolts, rivets, welds, and spot welds to the longitudinal surface 26. The volute ring 128 defines a plurality of bleed-off ports 134 for communicating fluid from the region between the volute ring 128 and the rotor 14J to the exterior of the volute ring 128. The bleed-off ports 134 are configured to drain the volute ring 128 at a chosen rate that maintains a desired pressure within the cavity 12 and maintains a desired pressure gradient in the fluid 86F trapped by the volute ring 128. In an alternative embodiment, one or both of the opposed ends 130 may be raised from the longitudinal exterior 26 by spacers (not shown) or the like such that fluid can escape from the volute ring element 128 by flowing between the volute ring element 128 and the rotor 14J.

In this implementation, the volute ring element 128 has the same rotational speed as the front section 110 and rear section 112, thereby reducing the fluidic shear present in the embodiment shown in FIG. 7 and FIG. 10a. With the reduction in fluidic shear provided by the volute ring element in FIG. 10b, the pressure within the circumferential ring of fluid 86f formed inside the volute ring element will be greater, which facilitates more violent bubble collapse. In some implementations of the invention it may be desirable to have the volute element 128 driven at a speed higher than that of the rotor 14J to increase the pressure within the fluid 86f trapped by the volute ring 128; the increased pressured caused by the increased rotational speed of the volute ring element 128. In that case, the volute ring 128 is not attached to the rotor 14J and is driven by an outside motive force. In a preferred implementation of the invention, the volute ring 128 is supported by a bearing element (not shown) surrounding the main input shaft 16 of the roto-dynamic fluidic device 2, and the volute ring 128 is driven by a planetary gear transmission (not shown) to spin at a chosen rpm higher than that of the rotor 14J. The center gear of the planetary gear transmission being affixed to the input shaft 16 of the device.

In alternative embodiments, the volute ring element 128 may have a sequence of peaks and valleys between the opposed ends 130; the number of peaks related to the type of rotor 14 that the volute ring element 128 is used with. For example, in one non-limiting embodiment, the rotor 14 (see FIG. 2A) includes three sets of fluid passages 32, each set of passages having second openings 38 that are approximately longitudinally aligned on the longitudinal exterior 26. (A first set proximal to the front face 22; a second set proximal to the rear face 24; and a third set between the first and second set.) In this case, a volute ring element 128 for use with the rotor 14a would preferably include three peaks so that each of the peaks is aligned with one of the sets of openings. However, in this embodiment, the volute ring element 128 could also include fewer or more peaks because even though it is preferable to coincide the peaks with the sets of openings, it is not is required that the peaks and sets of openings coincide, and a single peak could be wide enough to traverse more than one set of openings. For the purposes of discussing a non-limiting embodiment of the volute ring element 128, the rotor 14a was described as having sets of openings that are approximately longitudinally aligned. However, it should be remembered that the second openings 38 disposed on the longitudinal exterior 26 need not be disposed such that they are approximately longitudinally aligned. The second openings 38 in any of the non-limiting rotors 14 described hereinabove may disposed in any predetermined configuration or random configuration.

In another embodiment, the front section 112 and rear section 1110 may spin at different speeds to each other, or the two elements may counter-rotate with respect to one another through known means, all of which will serve to create small vortices within the minimal clearance 126, thereby aiding bubble formation.

In yet another preferred implementation of the invention, the input shaft 102 is connected to the volute element 128 and the rotor 14J is supported by a bearing mounted on the shaft 102 and allowed to freewheel such that the motive force for the rotor becomes the shearing effect of the fluid between the volute element and the rotor's external surfaces. In this manner, the speed of the volute element will always be higher than the speed of the rotor and a control means such as a brake (not shown) actuated by control means known to those skilled in the art of speed control. The brake is provided to maintain the rotor at a chosen rotational speed, such speed being advantageous for creating the level of cavitation desired within the device, said speed alterations being able to be performed without interfering with the rotation of the volute element and the established circumferential liquid ring therein.

Figure 11:
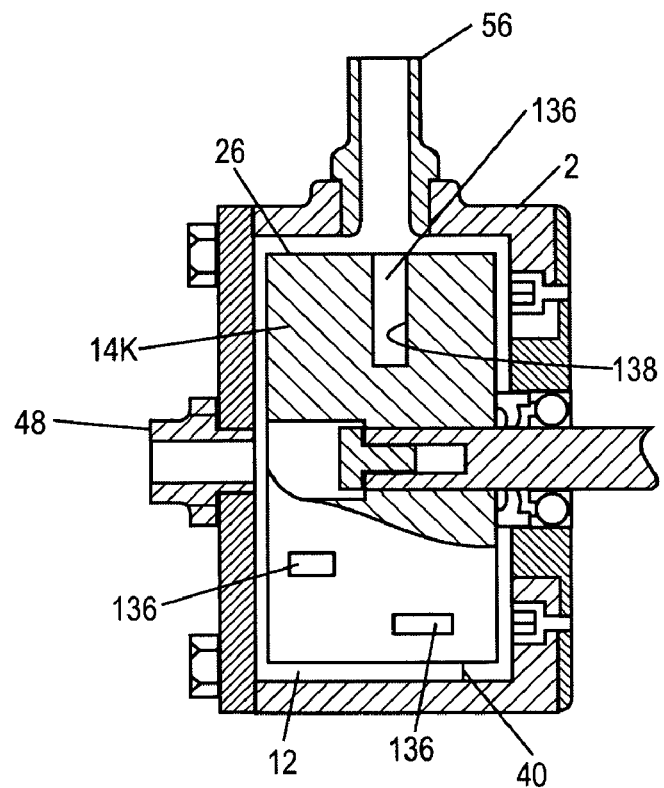
FIG. 11 is an cross sectional view of a roto-dynamic fluidic device.

Refer to FIG. 11, which shows a cross sectional view of the housing 2 and a partial cut away view of a rotor 14K, the rotor 14K includes a plurality of cavities 136 that extend inward from the exterior surface 26 of the rotor 14K. The cavity 12 of the roto-dynamic fluidic device 2 is essentially filled by both the rotor 14K and fluid, which enters via inlet/outlet port 48, and exits via outlet/inlet port 56. In operation, as the fluid fills an individual cavity 136 within the spinning rotor 14K, tension is created in the fluid due to centripetal force and a vapor bubble is created within cavity 136. Due to centrifugal forces acting on the fluid, the fluid contained within the now filled cavity 136 is propelled in an outwardly radial direction, carrying the recently formed vapor bubble with the fluid flow. In this way the vapor bubble is ejected from cavity 126 and sent into interstitial clearance region 40. Typically, the expelled bubbles experience a high pressure field due to the centrifugal force acting on the total fluid mass, which facilitates the implosion of the vapor bubble upon itself, thus completing the cavitation cycle. In some modes of operation, the vapor bubbles may collapse within the cavity 136 prior to their reaching the interstitial clearance 40. It should be understood that cavities 136 within the rotor may have any predetermined shape. Non-limiting examples of cross sections for cavity 126 include circular, or square, or rectangular, or an irregular shape. Furthermore, the cavities may have diverging or converging walls which facilitate the creation of tensile stress within the fluid to enhance the formation of vapor bubbles. Typically, the cavities 136 are disposed on the exterior surface 26 in a irregular/quasi-random or random manner. The irregularity or randomness of the cavities 136 promotes cavitation over regularly spaced cavities 136 because the fluid between the rotor 14K and the housing 4 is more turbulent than when the cavities 136 are evenly/regularly spaced. Furthermore, it is preferred that the opening for a cavity 136 have an abrupt wide edge, instead of a curved round edge, at the upstream portion of the cavity 136.

The cavities 136 are defined by inner walls 138, which is coated with a lining material 140. The lining material 140 can be rough, or smooth, or threaded, or have ridges, or include one or more materials that are different than the rotor material to enhance or hinder reactions that occur when cavitation is present, or have magnetic properties. In one preferred embodiment, the material 140 includes one or more permanent or electrical magnets that affect chemical processes within the roto-dynamic fluidic device 2. The magnets can be placed upstream or downstream from where vapor bubbles are formed or from where the vapor bubbles collapse. Typically, electrical magnets are controllable such that their magnet fields can be controlled for strength for the purpose of, among other things, affecting chemical processes within the device.

Further, the housing may be fitted with such permanent and/or electric magnets in the fluid flow between the surface of the rotor and inner surface of the housing to affect the chemical processes within the device.

In addition, in one embodiment, the material 140 includes a membrane. The membrane may be located upstream or downstream from where vapor bubbles are formed or from where the vapor bubbles collapse.

Furthermore, in one embodiment, the material 140 includes metal alloys that affect specific chemical reactions or physical elements within the fluid as it passes through the cavity, with or without cavitation occurring. Further, in these embodiments, one or more cavity(ies) may include a chemical process tube such as disclosed in U.S. Pat. Nos. 5,048,499; 5,197,446; 5,482,629; or 6,106,787 which are incorporated herein by reference.

In other preferred embodiments of the invention, there are mechanical or pizeo-electric or electrical ultrasonic transducers placed proximate to the cavities, either within the cavities themselves or in the housing's inner wall, and the transducers enhance or hinder reactions that occur when cavitation is present. Typically, the units or transducers are activated at frequencies that will intensify the cavitation of fluid within one or more selected cavities.

In yet in another embodiment, the inner walls 136 are not lined by material 140, but are instead themselves rough, or smooth, or threaded, or have ridges, or include one or more materials that are different than the rotor material to enhance or hinder reactions that occur when cavitation is present, or have magnetic properties.

Figure 12:
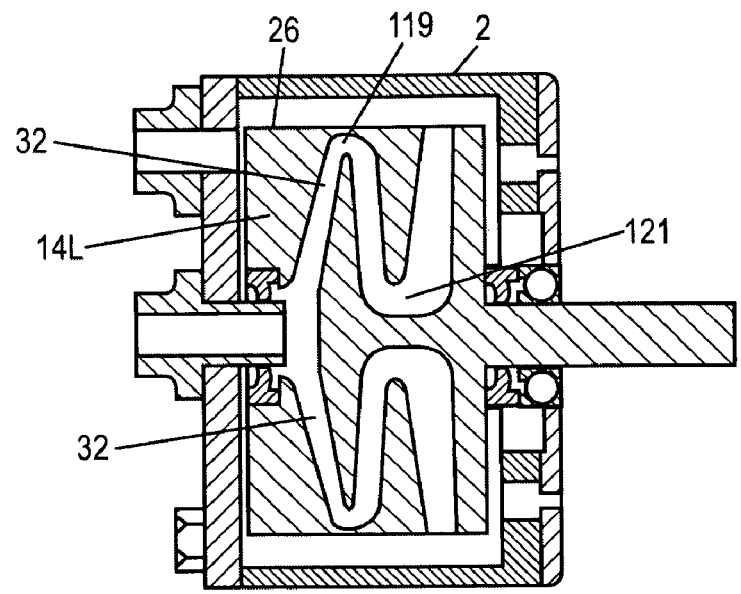
FIG. 12 is an cross sectional view of a roto-dynamic fluidic device.

Refer to FIG. 12, which shows a rotor 14L and the housing 2 in cross section, the rotor 14L defines undulating passages 32. For each one of the passages, the passage 32 extends radially outward from the central void 28 to a point of inflection 119 where the passage 32 then extends inward to a second point of inflection 121. From the second point of inflection 121, the passage 32 extends to the surface 26. In alternative embodiments, the passage 32 can define more than two points of inflection. Typically, the rotor 14L acts as a pump as a fluid is flowing from the center void 28 to the first point of inflection, and the formation of vapor bubbles typically occurs in the region of the second point of inflection. If the passage 32 defines more than one pair of points of inflection, then cavitation may occur in the regions where the flow of the fluid changes from inward to outward.

Figure 13:
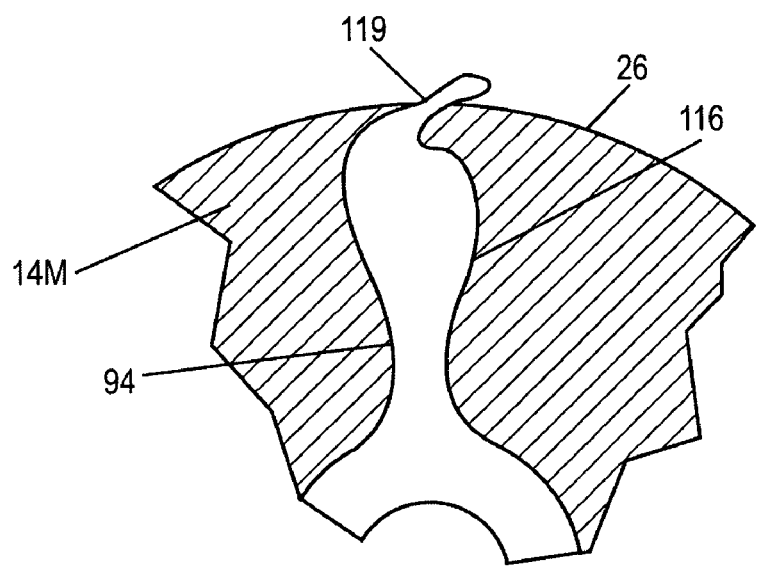
FIG. 13 is an cut away/cross sectional view of a rotor.

Refer to FIG. 13, which shows a portion of a rotor 14M in cross section, the rotor 14M is used for, among other things, vaporizing a fluid. The rotor 14M defines a passage 32 having a first restrictive element 119 such as for example a nozzle. Preferably, the passage 32 in non-uniformly shaped within the rotor, and preferably, the restrictive element 119 is located at the exterior surface 26. The passage 32 defines a second restrictive element 94 and a diverging section 116 that is down stream from the second restrictive element 94.

In the preferred embodiment, fluid flows through the second restrictive element 94, and consequently, the fluid cavitates in the diverging section 116. The fluid is chosen such that the cavitation process creates a phase change in the fluid, or facilitates the combustion of a monopropellant, or of a fuel when air or oxygen is added by additional passages (not shown), such that high pressure is created, whereupon the partially or fully affected fluid is exhausted from the rotor 14M via the first restrictive element 119. Combustion may be precipitated by known ignition or catalysis means. Preferably, the fluid or gases exiting through the surface of the rotor are directed such that a jet is formed and a force vector that is generally tangential to the surface of the rotor is formed. In alternative embodiments, the second restrictive element 119 can be disposed inside of the rotor 14M Furthermore, in alternative embodiments, the rotor 14M can include secondary channels that intersect with the passage 32. The secondary passages can be used for, among other things, introducing a second fluid, or gas, or exhausting the combusted fluid.

It should be emphasized that a fluid can include gases such as, but not limited to, argon, which can be premixed with the fluid before the fluid is received by the roto-dynamic fluidic device or the gas(es) can be mixed with a fluid in the roto-dynamic fluidic device prior to or after the formation of vapor bubbles. Typically, gases are mixed with the fluid to facilitate (or hinder) certain chemical reactions. In addition, particulate matter can also be mixed with the fluid. The particulate matter may be introduced to facilitate (or hinder) certain chemical reactions.

In yet another alternative embodiment, the roto-dynamic fluidic device 2 may include mechanical components such as a ratchet and pawl assembly for, among other things, vibrating the rotor 14.

The roto-dynamic fluidic system 1 can be used for, among other things, modifying or aerating fuels, sonochemical reactions, production of nano-materials or nano-fluids, separation/mixing of gases or fluids or particulates, steam production, purification of water, combustion of fuels, and creating special alloys.

It should be emphasized that the above-described embodiments of the present invention, particularly, any "preferred" embodiments, are merely possible examples of implementations, merely set forth for a clear understanding of the principles of the invention and that the embodiments disclosed hereinabove are non-limiting embodiments. Many variations and modifications may be made to the above-described embodiment(s) of the invention without departing substantially from the spirit and principles of the invention. Alternative embodiments may include more or fewer elements than were illustrated in the various non-limiting described embodiments. For example, the inducer 60 could be included in any one or none of the described embodiments. Similarly, it should be remembered that in the interest of brevity and clarity fluid flow was normally described in one direction, but the fluid flow can be reversed in each of the embodiments described hereinabove with appropriate modification where necessary. For example, if the fluid flow were reversed in rotor 14f, then the passage 32b would also be reversed such that the walls 34 would taper inward from the second opening 38 to the minimum clearance 95b and then expand in a step like manner. All such modifications and variations are intended to be included herein within the scope of this disclosure and the present invention and protected by the following claims.

What is claimed is:

1. An apparatus for facilitating cavitation in fluids, the apparatus comprising:
    a housing having a generally hollow interior, the housing defining a first opening for receiving a shaft and defining a fluid ingress opening and a fluid egress opening;
    a rotor disposed within the hollow interior of the housing, the rotor adapted to couple with a shaft, the rotor having an exterior surface, the rotor defining a first opening disposed on the exterior surface and a second opening with a fluid passage extending therebetween, wherein the fluid passage facilitates cavitation in a fluid, the rotor including a front face and an opposed rear face with a longitudinal exterior surface extending therebetween, wherein the front face defines a void extending rearward toward the rear face, the rotor defining a fluid passage extending generally outward from the void to the longitudinal exterior surface, wherein responsive to rotation of the rotor and fluid flowing through fluid passage in the rotor, cavitation occurs in the fluid, wherein a given opening selected from a set of openings consisting of the fluid ingress opening and the fluid egress opening is generally aligned with the void; and
    a fluid seal abutting the rotor, the fluid seal generally aligned with the void and the given opening, wherein the fluid seal substantially communicates direct fluid flow between the given opening and the void.

2. The apparatus of claim 1, further including:
    a pipe received by the given opening, the pipe extending at least partially into the hollow interior of the housing.

3. The apparatus of claim 2, wherein the front face of the rotor defines a notch extending around the circumference of the void, wherein the fluid seal fixedly abuts the notch and extends therefrom to the pipe.

4. An apparatus for facilitating cavitation in fluids, the apparatus comprising:
    a housing having a generally hollow interior, the housing defining a first opening for receiving a shaft and defining a fluid ingress opening and a fluid egress opening;
    a rotor disposed within the hollow interior of the housing, the rotor adapted to couple with a shaft, the rotor having an exterior surface, the rotor defining a first opening disposed on the exterior surface and a second opening with a fluid passage extending therebetween, wherein the fluid passage facilitates cavitation in a fluid, the rotor including a front face and an opposed rear face with a longitudinal exterior surface extending therebetween, wherein the front face defines a void extending rearward toward the rear face, the rotor defining a fluid passage extending generally outward from the void to the longitudinal exterior surface, wherein responsive to rotation of the rotor and fluid flowing through fluid passage in the rotor, cavitation occurs in the fluid; and
    a shaft defining a hollow interior in communication with the void, wherein a non-solid flows either into or out of the housing via the hollow shaft.

5. An apparatus for facilitating cavitation in fluids, the apparatus comprising:
    a housing having a generally hollow interior, the housing defining a first opening for receiving a shaft, the housing defining a fluid ingress opening and a fluid egress opening;

a rotor disposed within the hollow interior of the housing, the rotor adapted to couple with a shaft, the rotor having an exterior surface, the rotor defining a first opening disposed on the exterior surface and a second opening with a fluid passage extending therebetween, wherein the fluid passage facilitates cavitation in a fluid, the rotor including a front face and an opposed rear face with a longitudinal exterior surface extending therebetween, wherein the front face defines a void extending rearward toward the rear face, the rotor defining a fluid passage extending generally outward from the void to the longitudinal exterior surface, wherein responsive to rotation of the rotor and fluid flowing through fluid passage in the rotor, cavitation occurs in the fluid;

a restrictive element disposed in the fluid passage, wherein fluid in the fluid pressure on one side of the restrictive element is at a higher pressure than fluid on the opposite side of the restrictive element; and a second restrictive element disposed in the fluid passage, wherein fluid in the fluid passage on one side of the second restrictive element is at a higher pressure than fluid on the opposite side of the second restrictive element.

6. An apparatus for facilitating cavitation in fluids, the apparatus comprising:

a housing having a generally hollow interior, the housing defining a first opening for receiving a shaft, the housing defining a fluid ingress opening and a fluid egress opening;

a rotor disposed within the hollow interior of the housing, the rotor adapted to couple with a shaft, the rotor having an exterior surface, the rotor defining a first opening disposed on the exterior surface and a second opening with a fluid passage extending therebetween, wherein the fluid passage facilitates cavitation in a fluid, the rotor including a front face and an opposed rear face with a longitudinal exterior surface extending therebetween, wherein the front face defines a void extending rearward toward the rear face, the rotor defining a fluid passage extending generally outward from the void to the longitudinal exterior surface, wherein responsive to rotation of the rotor and fluid flowing through fluid passage in the rotor, cavitation occurs in the fluid;

a restrictive element disposed in the fluid passage, wherein fluid in the fluid pressure on one side of the restrictive element is at a higher pressure than fluid on the opposite side of the restrictive element; and a restrictive element biaser adapted to bias the restrictive element such that fluid flow past the restrictive element is approximately at a predetermined value.

7. An apparatus for facilitating cavitation in fluids, the apparatus comprising:

a housing having a generally hollow interior, the housing defining a first opening for receiving a shaft, the housing defining a fluid ingress opening and a fluid egress opening;

a rotor disposed within the hollow interior of the housing, the rotor adapted to couple with a shaft, the rotor having an exterior surface, the rotor defining a first opening disposed on the exterior surface and a second opening with a fluid passage extending therebetween, wherein the fluid passage facilitates cavitation in a fluid, the rotor including a front face and an opposed rear face with a longitudinal exterior surface extending therebetween, wherein the front face defines a void extending rearward toward the rear face, the rotor defining a fluid passage extending generally outward from the void to the longitudinal exterior surface, wherein responsive to rotation of the rotor and fluid flowing through fluid passage in the rotor, cavitation occurs in the fluid; and a transducer disposed within the housing, the transducer adapted to emit ultrasonic energy into the cavity.

8. The apparatus of claim 7, wherein the transducer is affixed to the rotor.

9. An apparatus for facilitating cavitation in fluids, the apparatus comprising:

a housing having a generally hollow interior, the housing defining a first opening for receiving a shaft, the housing defining a fluid ingress opening and a fluid egress opening;

a rotor disposed within the hollow interior of the housing, the rotor adapted to couple with a shaft, the rotor having an exterior surface, the rotor defining a first opening disposed on the exterior surface and a second opening with a fluid passage extending therebetween, wherein the fluid passage facilitates cavitation in a fluid, the rotor including a front face and an opposed rear face with a longitudinal exterior surface extending therebetween, wherein the front face defines a void extending rearward toward the rear face, the rotor defining a fluid passage extending generally outward from the void to the longitudinal exterior surface, wherein responsive to rotation of the rotor and fluid flowing through fluid passage in the rotor, cavitation occurs in the fluid; and a volute ring circumferentially disposed around the rotor, the volute ring adapted to spin about an axis and receive fluid from the rotor, wherein responsive to the volute ring spinning about the axis and having a fluid therein, the fluid develops a pressure gradient with maximum pressure distal from the axis.

10. An apparatus for facilitating cavitation in fluids, the apparatus comprising:

a housing having a generally hollow interior, the housing defining a first opening for receiving a shaft; and a rotor disposed within the hollow interior of the housing, the rotor adapted to couple with a shaft, the rotor having an exterior surface, the rotor defining a first opening disposed on the exterior surface and a second opening with a fluid passage extending therebetween, wherein the fluid passage facilitates cavitation in a fluid, wherein the rotor defines a front face and an opposed rear face, the exterior surface extends longitudinally between the opposed front and rear faces, wherein the second opening is disposed on the front face.

11. An apparatus for facilitating creation of cavitation in fluids, the apparatus comprised of:

a base having a rear wall and a longitudinal wall, the rear wall and longitudinal wall each having an interior side and an exterior side, wherein the longitudinal wall extends from the rear wall such that the interior side of the rear wall and the interior side of the longitudinal wall define a cavity, the rear wall having an opening extending from the interior side to the exterior side for receiving a shaft;

a face plate having an exterior side and an interior side, the face plate removably mounted to the base with the interior side of the face plate facing towards the cavity, wherein the face plate defines a first fluidic passage;

a rotor disposed within the cavity, the rotor having a front face, an opposed rear face, and a surface extending therebetween, the face plate defining a void for receiving a fluid, the void extending rearward into the rotor, the rotor defining a second fluid passage, the second fluid passage extending between the void and the exterior surface of the rotor, the second fluid passage for communicating a fluid between the void and the cavity; and a sealing element abutting the face of the rotor, wherein the sealing element, the void, and the first passage define a first fluidic region, wherein a second fluidic region is defined by the region of the cavity exterior to the rotor and the sealing element, wherein fluid is communicated between the first fluidic region and the second fluidic region via the second fluid passage and the sealing element substantially prevents direct communication of fluid between the first and second fluidic regions.

* * * * *